(12) United States Patent
Agia et al.

(10) Patent No.: US 12,008,762 B2
(45) Date of Patent: Jun. 11, 2024

(54) SYSTEMS AND METHODS FOR GENERATING A ROAD SURFACE SEMANTIC SEGMENTATION MAP FROM A SEQUENCE OF POINT CLOUDS

(71) Applicants: Christopher George-R Agia, Stouffville (CA); Ran Cheng, Shanghai (CN); Yuan Ren, Thornhill (CA); Bingbing Liu, Markham (CA)

(72) Inventors: Christopher George-R Agia, Stouffville (CA); Ran Cheng, Shanghai (CN); Yuan Ren, Thornhill (CA); Bingbing Liu, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 201 days.

(21) Appl. No.: 17/676,131

(22) Filed: Feb. 19, 2022

(65) Prior Publication Data

US 2023/0267615 A1 Aug. 24, 2023

(51) Int. Cl.
   *G06T 7/11* (2017.01)
   *G01S 17/89* (2020.01)
   *G06F 18/21* (2023.01)
   *G06F 18/213* (2023.01)
   *G06F 18/2431* (2023.01)

(52) U.S. Cl.
   CPC ............... *G06T 7/11* (2017.01); *G01S 17/89* (2013.01); *G06F 18/213* (2023.01); *G06F 18/217* (2023.01); *G06F 18/2431* (2023.01); *G06T 2200/04* (2013.01); *G06T 2207/10016* (2013.01); *G06T 2207/20081* (2013.01); *G06T 2207/20084* (2013.01); *G06T 2207/30252* (2013.01)

(58) Field of Classification Search
   None
   See application file for complete search history.

(56) References Cited

U.S. PATENT DOCUMENTS

2019/0311546 A1* 10/2019 Tay .................. G05D 1/0088
2021/0063198 A1* 3/2021 Nister .................. G01S 7/417
(Continued)

OTHER PUBLICATIONS

Charles R. Qi, Hao Su, Kaichun Mo and Leonidas J. Guibas, Pointnet: Deep learning on point sets for 3d classification and segmentation, Proceedings of the IEEE conference on computer vision and pattern recognition, 19 pages, arXiv preprint arXiv: 1612.00593 Apr. 10, 2017.
(Continued)

*Primary Examiner* — Yi Wang

(57) ABSTRACT

System and method for semantic segmentation of point clouds. The method may include: generating, via a first neural network, a birds-eye-view (BEV) image of the environment from the aggregated point cloud; generating, via a second neural network, a labelled BEV image from the BEV image, wherein each pixel in the labelled BEV image is associated with a class label from a set of class labels; generating a BEV feature map; and generating, via a third neural network, the road surface segmentation map in the form of a refined labelled BEV image based on the labelled BEV image by smoothing the labelled BEV image using the BEV feature map, wherein each pixel in the refined labelled BEV image is associated with a class label from the set of class labels.

17 Claims, 11 Drawing Sheets

(56) References Cited

U.S. PATENT DOCUMENTS

| | | | |
|---|---|---|---|
| 2022/0044024 A1* | 2/2022 | Sambo | G06T 7/20 |
| 2023/0049383 A1* | 2/2023 | Lehtimäki | G06V 20/588 |

OTHER PUBLICATIONS

Bichen Wu, Alvin Wan, Xiangyu Yue, and Kurt Keutzer, Squeezeseg: Convolutional neural nets with recurrent crf for real-time road-object segmentation from 3d lidar point cloud, 2018 IEEE International Conference on Robotics and Automation (ICRA), 7 pages, arXiv preprint arXiv: 1710.07368 Oct. 19, 2017.

Bichen Wu, Xuanyu Zhou, Sicheng Zhao, Xiangyu Yue and Kurt Keutzer, Squeezesegv2: Improved model structure and unsupervised domain adaptation for road-object segmentation from a lidar point cloud, 2019 International Conference on Robotics and Automation (ICRA), 7 pages, arXiv preprint arXiv: 1809.08495 Sep. 22, 2018.

Erdal Aksoy, Eren, Saimir Baci, and Selcuk Cavdar, SalsaNet: Fast Road and Vehicle Segmentation in LiDAR Point Clouds for Autonomous Driving, 7 pages, arXiv preprint arXiv: 1909.08291 Sep. 18, 2019.

Alex H. Lang, Sourabh Vora, Holger Caesar, Lubing Zhou, Jiong Yang, and Oscar Beijbom, Pointpillars: Fast encoders for object detection from point clouds, Proceedings of the IEEE Conference on Computer Vision and Pattern Recognition, 9 pages, arXiv preprint arXiv: 1812.05784 May 7, 2019.

Tsung-Yi Lin, Priya Goyal, Ross Girshick, Kaiming He, and Piotr Dollár, Focal loss for dense object detection, Proceedings of the IEEE international conference on computer vision, 10 pages, arXiv preprint arXiv: 1708.02002 Feb. 7, 2018.

Yang, Bin, Ming Liang, and Raquel Urtasun, Hdnet: Exploiting hd maps for 3d object detection, Conference on Robot Learning, 10 pages, arXiv preprint arXiv: 2012.11704 Dec. 21, 2020.

Teichmann, Marvin TT, and Roberto Cipolla, Convolutional CRFs for semantic segmentation, 12 pages, arXiv preprint arXiv:1805.04777 May 15, 2018.

Carole H Sudre, Wenqi Li, Tom Vercauteren, Sebastien Ourselin, and M. Jorge Cardoso, Generalised dice overlap as a deep learning loss function for highly unbalanced segmentations, Deep learning in medical image analysis and multimodal learning for clinical decision support, 8 pages, arXiv preprint arXiv: 707.03237 Jul. 14, 2017.

Kaiming He, Xiangyu Zhang, Shaoqing Ren, and Jian Sun, Deep residual learning for image recognition, Proceedings of the IEEE conference on computer vision and pattern recognition, 12 pages, arXiv preprint arXiv:1512.03385 Dec. 10, 2015.

Ronneberger, Olaf, Philipp Fischer, and Thomas Brox, U-net: Convolutional networks for biomedical image segmentation, International Conference on Medical image computing and computer-assisted intervention, 8 pages, arXiv preprint arXiv:1505.04597 May 18, 2015.

Long, Jonathan, Evan Shelhamer, and Trevor Darrell, Fully convolutional networks for semantic segmentation, Proceedings of the IEEE conference on computer vision and pattern recognition, 12 page, arXiv preprint arXiv:1605.06211 May 20, 2016.

* cited by examiner

Gibbs Distribution: $P(X|I) = \frac{1}{Z(I)} \exp(-E(X|I))$

Energy Function: $E(X|I) = \sum_{i=1}^{N} \psi_u(\hat{x}_i|I) + \sum_{i \neq j}^{N} \psi_p(\hat{x}_i, \hat{x}_j|I)$ Pairwise Potential: $\psi_p(\hat{x}_i, \hat{x}_j|I) = \mu(\hat{x}_i, \hat{x}_j) \sum_{m=1}^{K} \omega^{(m)} K_G^{(m)}(f_i^I, f_j^I)$ Unary Potential: Computed by Encoder/Decoder

FIG. 7B

SYSTEMS AND METHODS FOR GENERATING A ROAD SURFACE SEMANTIC SEGMENTATION MAP FROM A SEQUENCE OF POINT CLOUDS

TECHNICAL FIELD

The present disclosure relates to processing point clouds for autonomous driving of a vehicle. Specifically, the present disclosure relates to processing a sequence of point clouds to generate a birds-eye-view (BEV) image of an environment of the vehicle which includes pixels associated with road surface labels.

BACKGROUND

Perception is an integral part of intelligent/autonomous systems in various fields such as driving, manufacturing, inspection, and medical diagnosis. Artificial intelligence is widely used for perception applications in which computing systems learn to interpret and understand the visual world using digital images or point clouds of coordinate-based location data. Using digital images generated by cameras or point clouds generated by detection and ranging (DAR) sensors, a computing system can learn a model using deep learning to accurately "perceive" an environment (i.e., detect and classify objects in the images or point clouds) and react to what is "perceived" in the environment.

In autonomous driving, a vehicle may have different types of sensors mounted to a body of the vehicle which "perceive" an environment surrounding the vehicle as the vehicle operates in the environment and an intelligent/autonomous agent may control operation of the vehicle based on the "perceived" environment. For example, cameras mounted on the vehicle can be used to capture images of an environment surrounding the vehicle. Detection and ranging (DAR) sensors mounted to the vehicle, such a spinning scanning light detection and ranging (LiDAR) sensor, can scan the environment surrounding the vehicle and generate three-dimensional (3D) point clouds that represent each scan of the environment. A computing system may process the images received from the cameras and/or the points clouds received from LiDAR sensors to detect objects in the images and/or point clouds and classify the detected objects.

A computing system may use semantic segmentation methods to process images and/or point clouds to perceive a surrounding scene, which is an environment surrounding the vehicle. Semantic segmentation methods predict a class label for every pixel in an image or a class label for every point in a point cloud corresponding to a given class in a pre-defined set of labels for every object detected in the image and/or point cloud (e.g., another vehicle, pedestrian, building, etc.). The plurality of pixels or points with the same label represents a mask (segment) used to identify an object (e.g., a vehicle, a person, a bicycle, etc.) in the image and/or point cloud. Although some semantic segmentation methods may detect and identify a "complete" segment such as a bicycle, a vehicle, or a building, others may detect and identify parts of the "complete" segment such as the saddle, the wheels, and the bicycle's pedal of a bicycle without identifying the bicycle as a whole. The features being identified in an image and/or point cloud depends on which categories the segmentation method is configured to identify.

Semantic segmentation of point clouds is a relatively new problem and known solutions suffer from one or more of a variety of drawbacks such as being limited to a single point cloud input, quantization error in input, point cloud data points, issues predicting at range, a requirement of hand-crafted input features, and a lack of refinement in predictions.

SUMMARY

The present disclosure describes systems and methods which provide one or more efficient techniques to perform semantic segmentation of a sequence of point clouds, thereby reducing the time and resources required to detect road surfaces in the 3D point clouds and classify the detected objects in the sequence of point clouds. The systems and methods may be used to perform semantic segmentation on a sequence of point clouds and generate a refined BEV image in which each pixel of the BEV image is associated with a class label such as a road surface class label. The systems and methods may be embodied by an autonomous vehicle which may include an automated driving system (ADS) which autonomously or semi-autonomously controls operation of the vehicle based on information obtained from the different types of sensors. The ADS may use the road surface semantic segmentation results to perform vehicle localization, path planning, motion planning and trajectory generation for the autonomous vehicle.

In accordance with a first aspect of the present disclosure, there is provided a computer-implemented method of generating a road surface segmentation map segmentation. The method comprises: receiving a sequence of point clouds, each respective point cloud of the sequence of point clouds representing a three-dimensional (3D) scan of an environment at a different point in time; generating an aggregated point cloud based on the sequence of point clouds; generating, via a first neural network, a birds-eye-view (BEV) image of the environment from the aggregated point cloud; generating, via a second neural network, a labelled BEV image from the BEV image, wherein each pixel in the labelled BEV image is associated with a class label from a set of class labels; generating a BEV feature map; and generating, via a third neural network, the road surface segmentation map in the form of a refined labelled BEV image based on the labelled BEV image by smoothing the labelled BEV image using the BEV feature map, wherein each pixel in the refined labelled BEV image is associated with a class label from the set of class labels.

The example embodiments of the systems and methods of the present disclosure receive a sequence of point clouds, which may have been generated over a period of time by a DAR sensor, such as a LIDAR sensor, and generate a final BEV image having pixels labeled with various class labels, such as road surface class labels, based on the sequence of point clouds. The sequence of point clouds, which are processed to generate a densified, aggregated point cloud, help ensure that even dynamic objects, which may have moved during the period of time, can be properly detected and classified. Furthermore, by implementing a unique combination of techniques such as sliding window buffer for the sequence of point clouds and Pillar Feature Net (PFN), rich learned features can be extracted from the aggregated point cloud for semantic segmentation, eliminating the need for hand-crafted input from a spare point cloud.

In some or all examples of the first aspect, the BEV feature map is generated based on a set of pillars generated from the aggregated point cloud, wherein each pillar in the set of pillars is a voxel corresponding to a point in the aggregated point cloud with coordinates x, y in the x-y plane and an unlimited spatial extent in the z direction.

In some or all examples of the first aspect, the method comprises: generating the set of pillars from the aggregated point cloud.

In some or all examples of the first aspect, the BEV feature map defines three elements for each pixel in the BEV image, the three elements being each height, intensity and density.

In some or all examples of the first aspect, the height of a pixel in the BEV feature map is represents the difference between points in a pillar having a maximum and a minimum elevation, the intensity of a pixel in the BEV feature map represents a mean of the intensity of the corresponding points in a pillar, and the density of a pixel in the BEV feature map represents the number of points in the respective pillar.

In some or all examples of the first aspect, the BEV feature map defines three elements for each pixel in the BEV image, the three elements being each height, intensity and density.

In some or all examples of the first aspect, the smoothing comprises performing Gaussian kernel smoothing on the labelled BEV image using the BEV feature map.

In some or all examples of the first aspect, the Gaussian kernel smoothing comprises: generating Gaussian kernels based on the BEV feature map and the class labels of the labelled BEV image; and smoothing the labelled BEV image with the Gaussian kernels to generate the refined labelled BEV image.

In some or all examples of the first aspect, the method further comprises: generating and storing an elevation value for each pixel in the refined labelled BEV image based on the labelled BEV image.

In some or all examples of the first aspect, generating the aggregated point cloud is based on an equation:

$$PC_{t\_agg} = \bigcap_{i=1}^{w} \tau_{1,i} PC_i$$

wherein: $PC_{t\_agg}$ represents the aggregated point cloud; w is a window size parameter; the point cloud having a most recent timestamp in the sequence of points clouds is a target point cloud; each point cloud having a timestamp earlier than the most recent timestamp in the sequence of points clouds is a source point cloud; $\tau_{1,i}$ represents a homogenous transformation between the target point cloud and each respective source point cloud i; and $PC_i$ is the respective source point cloud i.

In some or all examples of the first aspect, the sequence of point clouds is generated by a LIDAR sensor on a vehicle, and the homogenous transformation is computed based on odometry data from the vehicle captured between the target point cloud and each respective source point cloud i.

In some or all examples of the first aspect, the odometry data comprises data representing a rotation speed of one or more wheels of the vehicle.

In some or all examples of the first aspect, the value of w is an integer value between 2 to 5.

In some or all examples of the first aspect, the first neural network is a Pillar Feature Net (PFN) neural network, the second neural network is an encoder/decoder (E/D) neural network, and the third neural network is a Convolutional Conditional Random Field (ConvCRF) neural network.

In some or all examples of the first aspect, the method further comprises: training the PFN neural network, the E/D neural network and the ConvCRF neural network by, during each training epoch: generating a plurality of predicted labels by the PFN neural network, the E/D neural network and the ConvCRF neural network; receiving or retrieving a plurality of ground truth labels; computing a loss based on the plurality of ground truth labels and the plurality of predicted labels; and refining one or more weights in the PFN neural network, the E/D neural network and the ConvCRF neural network based on the loss.

In some or all examples of the first aspect, the loss $L_{surface}$ is computed based on a local loss term $L_{focal}$ and a dice coefficient loss term $L_{dice}$ based on an equation:

$$L_{surface} = \alpha * L_{focal} + (1-\alpha) * L_{dice}.$$

In some or all examples of the first aspect, wherein $\alpha$ has a value between 0.6 and 0.8.

In some or all examples of the first aspect, the local loss term $L_{focal}$ is computed based on an equation:

$$L_{focal} = -\mu^\beta (1-\hat{p}_t^\beta)^\gamma \log(\hat{p}_t^\beta),$$

wherein $\beta$ is the ground truth label for a given pixel, $\mu^\beta$ is a class-specific weight, and $(1-p_t^\beta)^\gamma$ is a modulating term.

In some or all examples of the first aspect, the method further comprises: displaying the refined labelled BEV image on a display of a computing system.

In accordance with a further aspect of the present disclosure, there is provided a computing device comprising one or more processors and a memory. The memory having tangibly stored thereon executable instructions for execution by the one or more processors. The executable instructions, in response to execution by the one or more processors, cause the computing device to perform the methods described above and herein.

In accordance with a further aspect of the present disclosure, there is provided a non-transitory machine-readable medium having tangibly stored thereon executable instructions for execution by one or more processors. The executable instructions, in response to execution by the one or more processors, cause the one or more processors to perform the methods described above and herein.

Other aspects and features of the present disclosure will become apparent to those of ordinary skill in the art upon review of the following description of specific implementations of the application in conjunction with the accompanying figures.

BRIEF DESCRIPTION OF THE DRAWINGS

FIG. 7B shows some example equations implemented by the ConvCRF refinement process in FIG. 7A.

DETAILED DESCRIPTION OF EXAMPLE EMBODIMENTS

Figure 1:
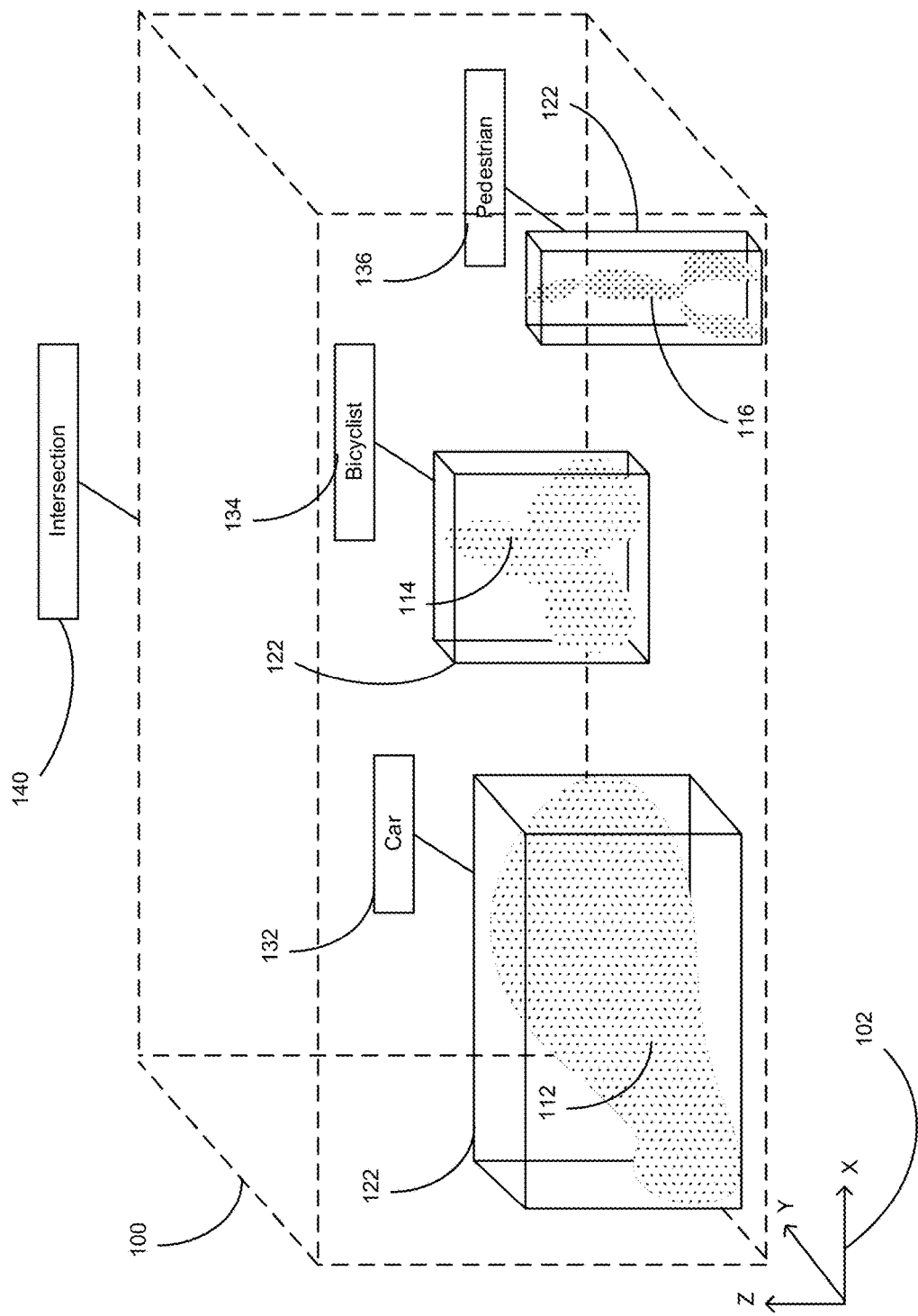
FIG. 1 is an upper front right side perspective view of an example point cloud providing an operating context for embodiments described herein.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

Semantic segmentation is the process of partitioning an image, a point cloud, or another type of visual representation into multiple segments (set of pixels or point, otherwise known as image or point cloud objects). The meaning of each segment is encoded as a label (e.g., a number), which is representative of a category that segment belongs to. More specifically, semantic segmentation of point clouds (hereinafter "point clouds") includes prediction of a category (represented by a class label) for one or more points of a point cloud using spatial and intensity information generated by a LIDAR sensor from a scan of an environment. In some cases, the prediction may also be performed for one or more pixels of an image that is generated based on the point clouds.

Encoder-Decoder neural network models that include Convolutional Neural Networks (CNNs) and Fully Convolutional Neural Networks (F-CNNs) have been used or proposed for semantic segmentation of images and point clouds. In the context of autonomous driving, such encoder-decoder neural network models have been implemented to classify pixels of an image or points of a point cloud, i.e., predict class labels for pixels of an image or points of a point cloud from a set of class labels such as road surface class labels.

Qi, Charles R., et al. "*PointNet: Deep learning on point sets for 3d classification and segmentation*," Proceedings of the IEEE conference on computer vision and pattern recognition, 2017, generally referred to as "PointNet" model, describes a neural network model that directly perform semantic segmentation on point clouds. Two other approaches described below attempt to segment either spatial filter velocimetry (SFV) or Birds-Eye-View (BEV) images constructed from a point cloud. Although showing strong performance in dense indoor scenes, the PointNet model struggles to perform segmentation on point clouds taken in a large and sparse outdoor environment, making it impractical for segmenting point clouds for use in outdoor scenarios.

"*Squeezesegv2: Improved model structure and unsupervised domain adaptation for road-object segmentation from a lidar point cloud*," International Conference on Robotics and Automation (ICRA), IEEE, 2019 by Wu, Bichen, et al., generally referred to as "SqueezeSegV2", describes a neural network model may be used to perform semantic segmentation on points clouds. SqueezeSegV2 constructs a SFV image of a point cloud prior and performs semantic segmentation on the SFV image using a neural network model including an encoder and decoder. However, constructing a SFV image introduces quantization error in the input to the neural network model and results in a loss of approximately 30% of the original points of the point cloud.

"*SalsaNet: Fast Road and Vehicle Segmentation in LiDAR Point Clouds for Autonomous Driving*," arXiv preprint arXiv:1909.08291, 2019 Aksoy et al., generally referred to as "SalsaNet" performs vehicle-road segmentation from a BEV image of a point cloud using a neural network model with an architecture similar to U-net (described in *U-Net: Convolutional Networks for Biomedical Image Segmentation*, arXiv preprint arXiv: arXiv: 1505.04597, 2015 by Olaf Ronneberger et al.) but lacks any refinement on the predictions of road surface class labels for the pixels of the BEV image generated by the encoder-decoder model.

As most existing semantic segmentation approaches attempt joint semantic segmentation to classify pixels with a road surface class label, these approaches are limited to using a single point cloud as an input, which may limit the accuracy of the segmentation if dynamic objects such as vehicles have moved since a point cloud was generated by a LiDAR sensor. Further, existing solutions are based on hand-crafted inputs constructed from the original point cloud. Hand-crafted inputs are rules-based feature extraction methods developed through human experience rather than being learned or optimized from data. By selecting features of the original point cloud based on human experience, existing solutions lose the opportunity to optimize for learned input features that can contribute to improved accuracy. Also, inference at far or partly-occluded regions may result in noisy predictions of semantic segmentations.

In addition, existing semantic segmentation approaches are primarily designed to semantically segment dynamic objects. From a BEV perspective of an environment, dynamic objects occupy far less area than roads in the environment. Thus, existing semantic segmentation approaches tend to optimize neural network models which perform semantic segmentation of images with standard losses that focus on local pixel-wise accuracy.

The present disclosure describes example embodiments of methods, systems, and computer-readable media for performing semantic segmentation of a sequence of point clouds which generates a BEV image of an environment in which an autonomous vehicle operates. The methods, systems, and computer-readable media perform semantic segmentation on a sequence of point clouds generated by a LiDAR sensor scanning an environment by processing the sequence of point clouds and optionally the odometer data of the vehicle.

A spinning scanning LIDAR may be mounted to a vehicle and used to scan environment surrounding the vehicle as the vehicle operates in the environment. The scanning LIDAR generates a point cloud for scan of the environment. Each point cloud includes a set of data points wherein each data point is reflection from an object in the environment, such as other vehicles, pedestrians, bicycles, motorcycles, buildings, and road surfaces such as roadways, intersections, sidewalks, and crosswalks. The vehicle on which a scanning LIDAR is mounted can be an autonomous vehicle. A computing system, which may be part of the vehicle or in communication with the vehicle, may process the point clouds generated by the LIDAR sensor to generate a road surface semantic segmentation map in the form of a refined labeled BEV image as described in further detail below. The road surface semantic segmentation map may be used by an intelligent/autonomous system of the vehicle 100, such as an automated driving system (ADS) or advanced-assistive driving system of the vehicle localization of the vehicle, path planning for the vehicle, or motion planning for the vehicle.

The vehicle on which the scanning LIDAR system is mounted may be any type of vehicle, such as a motor vehicle, such as a car, truck, bus, boat or ship, submarine, aircraft, warehouse equipment, construction equipment, tractor or other farm equipment. The teachings of the present disclosure are not limited to vehicles, or any particular type of vehicle, and may be applied to other objects, real or virtual, and to vehicles that do not carry passengers as well as vehicles that do carry passengers. The teachings of the present disclosure may also be implemented in non-vehicular mobile robots including, but not limited to, autonomous vacuum cleaners, rovers, lawn mowers, unmanned aerial vehicle (UAV), and other objects.

In addition to a scanning LIDAR sensor, the autonomous vehicle can include other types of sensors mounted to vehicle for sensing an environment of the vehicle (hereinafter referred to environmental sensors). The vehicle may also include sensors for sensing operating parameters of the vehicle, such as speed, position, orientation, and acceleration of the vehicle, a vehicle control system that is connected to environmental sensors and operating sensors, a drive control system and a mechanical system. The vehicle also comprises various structural elements such as a frame, doors, panels, seats, windows, mirrors and the like that are known in the art but that have been omitted from the present disclosure to avoid obscuring the teachings of the present disclosure. The environmental sensors are mounted to structural elements of the vehicle at various locations on the vehicle.

The vehicle may also include a computing system that processes information received from the environmental sensor (referred to hereinafter as a vehicle control system). The memory of the vehicle control system has stored thereon operating system and autonomous driving system. The autonomous driving system includes machine-readable instructions executable by a processor. The autonomous driving system include vehicle localization module, parking assistance module, autonomous parking module, driving assistance module, path planner, perception module, and other modules. Other modules may include for example mapping module, navigation module, climate control module, media player module, telephone module and messaging module, etc. are also stored in the memory.

The memory also stores a variety of data. The data may comprise sensor data received from the environmental and operating sensors. The sensor data may include image data received from the cameras, a three-dimensional point cloud received from the LIDAR sensor, radar data received from the radar sensor, odometry data received from the wheel odometer and/or an inertial measurement unit (IMU), and location data from global positioning system (GPS) sensor. The odometry data received from the wheel odometer includes rotation data (e.g., angular velocity) indicative of a rotation speed of the wheels of the vehicle. In addition, translation data indicative of a translation of the vehicle may be computed by using the odometry data of two rear wheels of the vehicle. For example, by integrating the rotation speeds of two rear wheels, a position and an orientation of the vehicle may be obtained. The odometry data received from the IMU includes three-axis angular velocity of the vehicle and three-axis acceleration of the vehicle.

The LIDAR sensor may be a scanning LIDAR sensor that captures information in a wide view (e.g., 360° view) about the vehicle. The scanning LIDAR sensor captures three-dimensional (3D) information about the environment, and generates a 3D point cloud, as further described in detail below in reference to FIG. 1. A point cloud is dataset that represents objects or space. A 3D point cloud includes a set of data points in 3D coordinate system of the scanning LIDAR sensor. It will be appreciated that other types of detection and ranging (DAR) sensors may generate a three-dimensional (3D) point cloud.

The camera, LIDAR sensor, radar sensor may collect information about the local external environment of the vehicle (e.g., any immediately surrounding obstacles) as well as information from a wider vicinity (e.g., the LIDAR sensor may collect information from an area of up to 100-meter radius or more around the vehicle). The sensors may also collect information about the position and orientation of the vehicle relative to a frame of reference (e.g., using the GPS sensor).

The sensor system communicates with the perception module via the processor to provide sensor data, including 3D point clouds received from the LIDAR sensor to the perception module. The perception module includes a neural network model configured performs sematic segmentation on the 3D point clouds to locate and classify objects in 3D point clouds, for example to local and classify objects in 3D point clouds with a class label such as pedestrian, building, tree, road, crosswalk, intersection, car, etc. The perception module may include any suitable neural network model which perform semantic segmentation on 3D point clouds.

The perception module may be implemented using software, which may include any number of independent or interconnected submodules. For example, instructions of the perception module may be executable by a dedicated image processor, or may be executable by one or more general processors of a vehicle controller of the vehicle.

FIG. 1 shows an example simplified processed point cloud 100, with points mapped to a three-dimensional coordinate system 102 defined by x, y, and z dimensions/planes which are perpendicular angles to each other, wherein the z dimension extends upward, typically as defined by the axis of rotation of the LIDAR sensor or other detection and ranging sensor which generates the point cloud 100. The point cloud 100 includes a number of points, each of which may be represented by a set of coordinates (x, y, z) within the point cloud 100 along with a vector of other values, such as an intensity value indicating the reflectivity of the object corresponding to the point. Each point represents a reflection of a laser at a point in space relative to the LIDAR sensor corresponding to the point coordinates. Whereas the example processed point cloud 100 is shown as a box-shape or rectangular prism, it will be appreciated that a typical point cloud generated by a LIDAR sensor is typically a 360-degree panoramic view of the environment surrounding the LIDAR sensor, extending out to a full detection range of the lasers of the LIDAR sensor. The example processed point cloud 100 is thus more typical of a small portion of an actual point cloud generated by the LIDAR sensor and is used for illustrative purposes.

The points of the point cloud 100 are clustered in space wherein the lasers of the LIDAR sensor are reflected by objects in the environment, thereby resulting in clusters of points corresponding to reflections from a surface of the object visible to the LIDAR sensor. A first cluster of points 112 corresponds to reflections from a surface of car. In the example processed point cloud 100, the first cluster of points 112 is enclosed by a bounding box 122-1 and may be associated with a class label, in this case the class label is "car" 132. The class label 132, along with other class labels 134, 136, 140 described below, may be generated by a computing system, such as the computing system 200 of FIG. 2 described more fully below.

A second cluster of points 114 corresponding to reflections from a surface of a bicycle is enclosed by a bounding box 122-2 and associated with the class label "bicyclist" 134, and a third cluster of points 116 corresponding to reflections from a surface of a person is enclosed by a bounding box 122-3 and associated with the class label "pedestrian" 136. Each of the first, second and third clusters of points 112, 114, 116 thus corresponds to an instance of a class, i.e. an instance of "car", "bicyclist", and "pedestrian" respectively. The entire processed point cloud 100 is associated with a scene type label 140 "intersection" indicating that the processed point cloud 100 as a whole corresponds to the environment near a road intersection (hence the presence of a car, a pedestrian, and a bicyclist in close proximity to each other).

Each bounding box 122-1, 122-2, 122-3 is sized and positioned for the respective cluster of points which it bounds, each class label 132, 134, 136 is associated with the cluster of points 112, 114, 116, respectively, and the scene label 140 is associated with the processed point cloud 100. A point cloud received from, for example, a LiDAR sensor, may be processed by the perception module using any suitable neural network model which performs semantic and/or instance segmentation of point clouds. The neural network model which performs semantic segmentation and/or instance segmentation may be trained using any suitable machine learning algorithm and a training dataset comprising labeled point clouds. As described above, neural network models which perform semantic and/or instance segmentation are generally very time-consuming and resource-intensive; the method and system for sematic segmentation of point clouds described herein may be used in some examples to provide an efficient technique to generate class labels, thereby reducing the time and resources required to manually locate and classify road surface elements and optionally objects in point clouds.

The class labels and bounding boxes of the example point cloud 100 shown in FIG. 1 correspond to class labels applied in the context of a prediction task, such as semantic segmentation or object detection, and the point cloud 100 could therefore be included in a training dataset used to train one or more neural network models which perform semantic segmentation.

Figure 2:
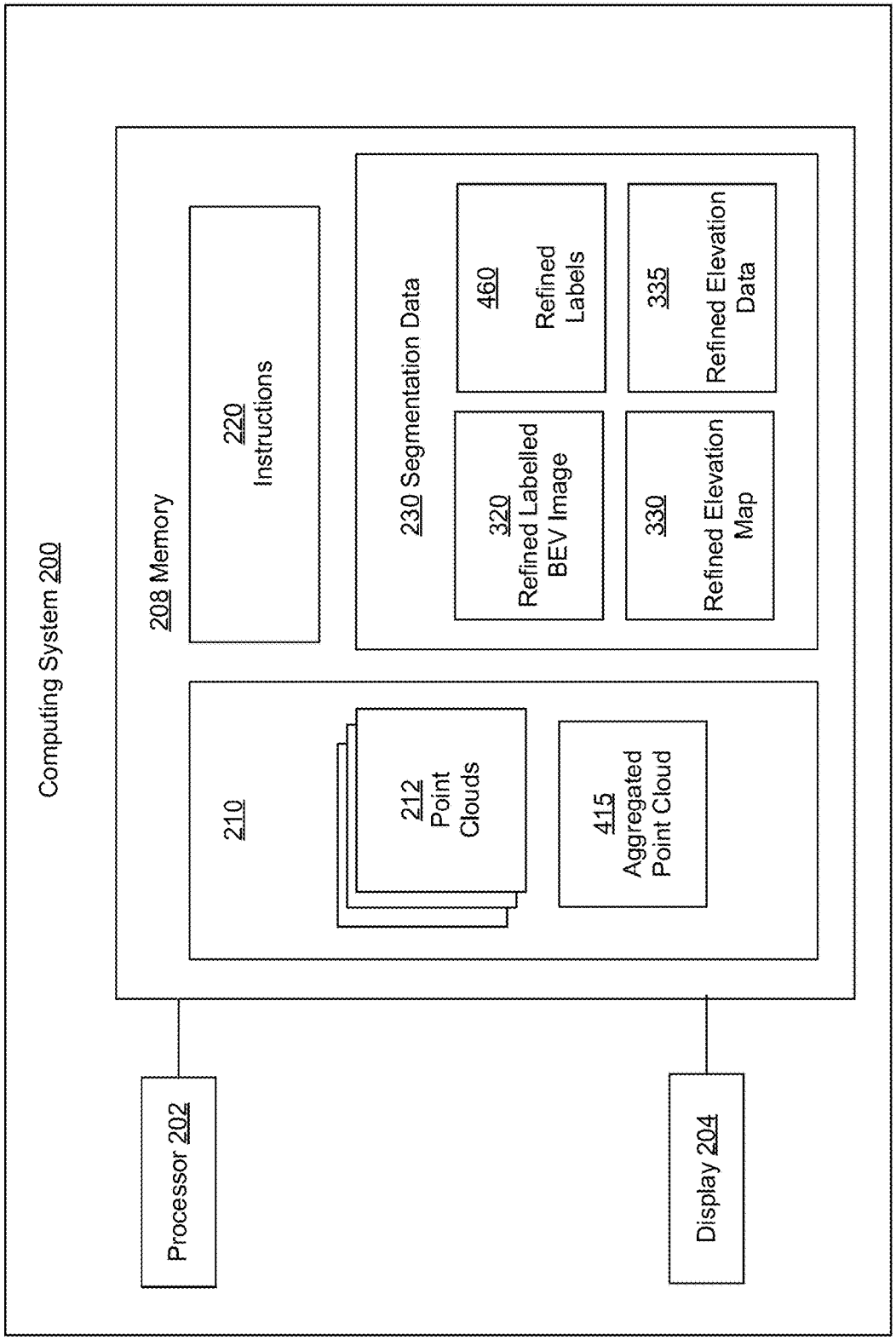
FIG. 2 is a block diagram illustrating some components of an example system for generating road surface semantic segmentation in accordance with examples described herein.

FIG. 2 is a block diagram of a computing system 200 (hereafter referred to as system 200), such as a computing system of an autonomous vehicle, for generating a road surface sematic segmentation map from a sequence of point clouds in accordance with the present disclosure. Although an example embodiment of the system 200 is shown and discussed below, other embodiments may be used to implement examples disclosed herein, which may include components different from those shown. Although FIG. 2 shows a single instance of each component of the system 200, there may be multiple instances of each component shown. The example system 200 may be part of, or connected to, a vehicle control system of an autonomous vehicle.

The system 200 includes one or more processors 202, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 202 may collectively be referred to as a processor 202. The system 200 include a display 204 for outputting data and/or information, for example, via a visual user interface of an autonomous vehicle.

The system 200 includes one or more memories 208 (collectively referred to as "memory 208"), which may include a volatile or non-volatile memory (e.g., a flash memory, a random access memory (RAM), and/or a read-only memory (ROM)). The non-transitory memory 208 may store machine-executable instructions for execution by the processor 202. A set of machine-executable instructions 220 defining road surface segmentation process (which is described in detail below with reference to FIG. 4) is shown stored in the memory 208, which may be executed by the processor 202 to perform the steps of the methods for road surface sematic segmentation described herein. The memory 208 may include other machine-executable instructions for execution by the processor 202, such as machine-executable instructions for implementing an operating system and other applications or functions.

The memory 208 stores a plurality of point clouds 100 as described above with reference to FIG. 1, and at least one aggregated point cloud 415 generated based on the plurality of point clouds 100, as described in detail below with reference to FIG. 4.

The memory 208 may also store other data, information, rules, policies, and machine-executable instructions described herein, including segmentation data 230 generated and/or used during the process of road surface semantic segmentation. Segmentation data 230 may include, for example, a refined labelled BEV image 320 generated by one or more machine learning models or networks stored in instructions 220, a set of refined labels 460 associated with the refined labelled BEV image 320, a refined elevation map 330 and a set of refined elevation data 335 associated with the refined elevation map 330, as further described with reference to FIG. 3.

In some examples, the system 200 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 208 to implement data storage, retrieval, and caching functions of the system 200.

The components of the system 200 may communicate with each other via a bus, for example. In some embodiments, the system 200 is a distributed computing system and may include multiple computing devices in communication with each other over a network, as well as optionally one or more additional components. The various operations described herein may be performed by different computing devices of a distributed system in some embodiments. In some embodiments, the system 200 is a virtual machine provided by a cloud computing platform.

Figure 3:
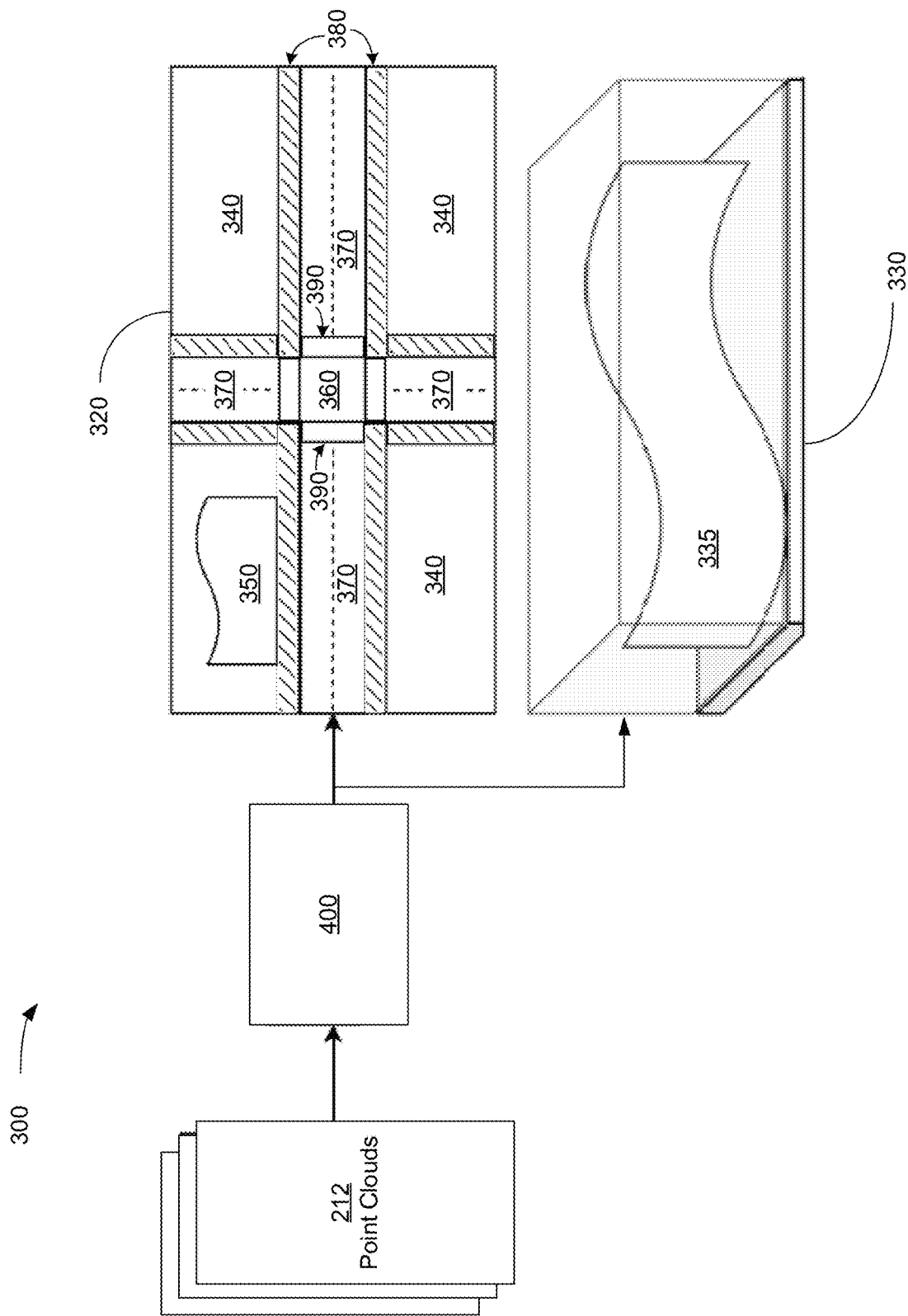
FIG. 3 is a block diagram illustrating example input and output of a computing system for generating road surface semantic segmentation in accordance with some example embodiments.

FIG. 3 is a block diagram 300 illustrating example input 212 and output 320, 330 of the computing system 200 implementing an example process 400 for generating a road surface semantic segmentation map from a sequence of point clouds. The input to the system 200 is a dataset 212 comprising a sequence of point clouds 100. Each point cloud 100 may contain an unordered set of points, and each point may be represented as $(x_j, y_j, z_j, i_j)$, j=1 . . . n, n is the respective total number of points in the point cloud 100, $(x_j, y_j, z_j)$ indicates a respective position of the point cloud 100 based on the coordinate system 102 (see FIG. 1), and $i_j$ is typically recorded as an integer number between 1-256, representing an intensity value indicating the reflectivity of the object corresponding to the point at the position $(x_j, y_j, z_j)$. After the system 200 has processed the dataset 212 via an example process 400, the system 200 generates one or both of: a refined labelled BEV image 320, and a refined elevation map 330 containing a set of refined elevation data 335.

The refined labelled BEV image 320 contains a set of refined class labels 460. In the shown example, the road surface class labels include background 340, parking lot (or parking) 350, intersection 360, road 370, sidewalk 380, and crosswalk 390. Other possible road surface class labels include terrain and other-ground. The refined class labels 460 may optionally include object class labels such as a building, a vehicle, a pedestrian, and a bicycle.

In some embodiments, each pixel in the refined labelled BEV image 320 may be associated with a class label such as a road surface class label. For example, the refined labelled BEV image 320 may be an RGB image, and a given pixel at position [x, y] of the refined labelled BEV image 320 may have a data structure [x, y, 1:3], wherein [x, y, 1] contains a value for the color red (R), [x, y, 2] contains a value for the color green (G), and [x, y, 3] contains a value for the color blue (B). Each of the value for R, G or B in the given pixel may be associated with a class label. For instance, a value of 0.3 for R can be associated with a class label of a driving road (e.g. the road on which the vehicle 100 is driving on), and a value of 0.5 for B can be associated with a class label of a crosswalk, and a value of 0.7 for G can be associated with a class label of a parking lot, and so on.

In some embodiments, the refined elevation map 330 may contain a set of refined elevation data 335. The refined elevation map 330 contains estimated height values for each of the pixels in the refined labelled BEV image 320. The estimated height values may be stored in the refined elevation data 335. For example, the refined elevation map 330 may be an RGB image, with the same dimensions as the refined labelled BEV image 320, and contains the same number of pixels as the refined labelled BEV image 320. Each pixel in the refined elevation map 330 may be stored using a data structure in a similar manner as each pixel in the refined labelled BEV image 320, and the data structure may include a value indicating a height value for the pixel in the refined elevation map 330, which can be also taken as a height value for a corresponding pixel in the refined labelled BEV image 320.

In some embodiments, the estimated height value for each pixel may be carried within the respective pixel of the refined labelled BEV image 320, eliminating the need for a separate refined elevation map 330. For example, a given pixel in the refined labelled BEV image 320 may be stored using a data structure [x, y, 1:3], wherein [x, y, 1] contains a value for the color red (R), [x, y, 2] contains a value for the color green (G), and [x, y, 3] contains a value for the color blue (B). Each of the value for R, G or B in the given pixel may be associated with a class label or a height value. For instance, a value of 0.3 for R can be associated with a class label of a driving road (e.g. the road on which the vehicle 100 is driving on), and a value of 0.5 for B can be associated with a class label of a crosswalk, and a value of 0.7 for G can be associated with a height value H meters, wherein H is computed based on the value for G. For instance, the value of 0.7 for G may be used to multiply a maximum height value of 100 meters, and the resulting height value H may be 100*0.7=70 meters.

Figure 4:
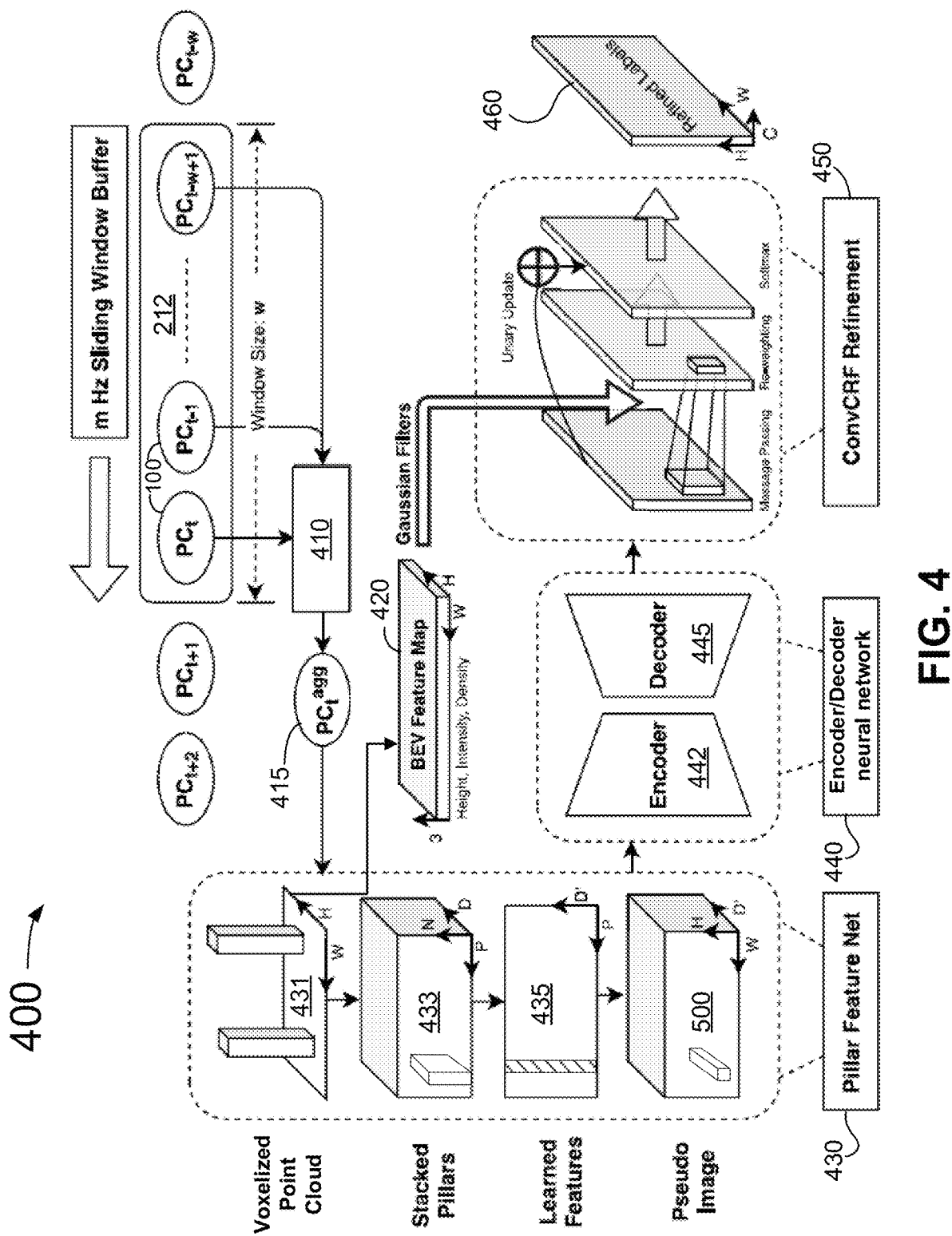
FIG. 4 is a block diagram illustrating an example process by a computing system for generating road surface semantic segmentation in accordance with some example embodiments.

FIG. 4 is a block diagram illustrating the example process 400 performed by a computing system 200 for generating a road surface semantic segmentation map from a sequence of point clouds in accordance with some example embodiments. The process 400 receives a sequence of point clouds 100 as input, collectively referred to as a dataset 212 of point clouds. The dataset 212 of point clouds are processed by a target re-projection sub-process 410 to generate an aggregated point cloud $PC_{t\_agg}$ 415. The aggregated point cloud $PC_{t\_agg}$ 415 is sent to a Pillar Feature Net (PFN) neural network 430 which processes the aggregated point cloud $PC_{t\_agg}$ 415 to generate a BEV image 500 (also referred to as a pseudo image) based on pillars (vertical columns) of the point cloud as described more fully below in connection with FIG. 5. A pillar is a voxel corresponding to a point in the aggregated point cloud $PC_{t\_agg}$ 415 with coordinates x, y in the x-y plane and an unlimited spatial extent in the z direction, hence there is no need for a hyperparameter to control the binning in the z dimension.

The BEV image 500 is provided to an encoder/decoder neural network 440 which generates a labelled BEV image 620, and optionally generates an elevation map 630 (see FIG. 6), based on the BEV image 500. The encoder/decoder neural network 440 includes a convolutional neural network 442 and a deconvolutional (i.e., transpose convolution) neural network 445. The labelled BEV image 620 and/or the elevation map 630, along with a BEV feature map 420 generated based on pillars generated from the aggregated point cloud 415, may be processed by a ConvCRF neural network 450 to generate a refined labelled BEV image 320 including refined labels 460, and optionally the refined elevation map 330.

Referring now to the target re-projection sub-process 410, which uses a sliding window buffer to generate the aggregated point cloud $PC_{t\_agg}$ 415. A sliding window buffer can be interpreted as a queue-like data structure that is parameterized by two variables, m and w: m is defined as the frequency at which a new element is enqueued and the oldest element is dequeued from the sliding window buffer, and the total number of elements in the fixed sized sliding window buffer is specified by the variable w, known as the window size parameter. In some embodiments, values m and w can be selected empirically or based on a defined set of metrics.

Each element in the sliding window buffer is a point cloud 100. At a specific given timestamp t, all the point clouds within the sliding window buffer form the dataset 212. The point clouds 100 are stored chronologically (i.e., sequentially from newest to oldest), from $PC_t$, which is the most recent point cloud 100, to $PC_{t-w+1}$, which is the oldest point cloud 100, wherein w is the total number of point clouds in the sliding window buffer or dataset 212 at given time t. At t, which is known as the inference time, all the point clouds 100 within the sliding window buffer are aggregated, via sub-process 410, to generate one dense point cloud, known as the aggregated point cloud $PC_{t\_agg}$ 415. In some embodiments, to account for motion of the vehicle between point cloud frames, all point clouds in the sliding window buffer except the most recent point cloud $PC_t$, which include $PC_{t-1}$ to $PC_{t-w+1}$ (also referred to as the source frames) are re-projected into the frame of reference of the most recent point cloud $PC_t$.

For example, the aggregated point cloud $PC_{t\_agg}$ 415 can be generated based on the equation:

$$PC_{t\_agg} = \bigcap_{i=1}^{w} \tau_{1,i} PC_i$$

w is the window size parameter; the point cloud $PC_t$ having a most recent timestamp in the sequence of points clouds is a target point cloud; each point cloud from $PC_{t-1}$ to $PC_{t-w+1}$ having a timestamp earlier than the most recent timestamp in the sequence of points clouds 212 is a source point cloud; $\tau_{1,i}$ represents a homogenous transformation between the target point cloud $PC_t$ and each respective source point cloud i; and $PC_i$ is the respective source point cloud i.

The homogenous transformation between the target point cloud (e.g., $PC_t$) and each respective source point cloud i (e.g., $PC_{t-1}$ or $PC_{t-w+1}$) can be computed, provided with the pose information from the vehicle's odometry system. A homogenous transform refers to translating and rotating a point cloud in one point cloud at a first timestamp to another point cloud at a second timestamp, to accommodate for the movement of the vehicle with the LIDAR sensor between the first timestamp and the second timestamp.

In some example embodiments, a homogenous transformation can be computed by one matrix multiplication. For example, for a sliding window size with size w=2, there can be a first point cloud $PC_t$ at timestamp t (i.e., current point cloud), and a second point cloud $PC_{t-1}$ at timestamp t−1 (i.e., in a previous point cloud). Odometry data from the vehicle can be used to compute data representing the vehicle's movement in terms of translation and rotation between timestamp t and t−1, and may be represented using a 4×4 matrix. For example, the odometry data received from the wheel odometer includes rotation data (e.g., angular velocity) indicative of a rotation speed of the wheels of the vehicle. In addition, translation data indicative of a translation of the vehicle may be computed by using the odometry data of two rear wheels of the vehicle. For instance, by integrating the rotation speeds of two rear wheels, a position and an orientation of the vehicle may be obtained.

The point cloud $PC_{t-1}$ at timestamp t−1 can be represented by an N×3 matrix, wherein N is the number of points. Another column of 1's can be added to the N×3 matrix, resulting in an N×4 matrix. The N×4 matrix may be multiplied to the 4×4 matrix to generate a new N×4 matrix, and the last column may be removed from the new N×4 matrix to generate a N×3 matrix, which represents a transformed point cloud $PC_{t-1}$, reprojected to the current point cloud at timestamp t. In a larger sliding window with w greater than 2, all the point clouds in previous frames (i.e., taken earlier than the most recent point cloud $PC_t$), may be reprojected this way to the current point cloud at timestamp t.

In one example embodiment of the sliding window buffer, m and w are each set to be 2 Hz and 5 point clouds, respectively (i.e., m=2 and w=5). These values can be selected empirically by analyzing heat maps representing visualization of the aggregated point cloud density in voxels around the vehicle. By comparing the increased point density surrounding the vehicle located at the center of the heat maps, it is noted that increasing w from 5 to 8 does not contribute much more to the aggregated point cloud density. Thus, 5 is selected as the buffer size for w.

The aggregated point cloud $PC_{t\_agg}$ 415 in the target point cloud of reference can be stored in an array like data-structure of shape N×4. Here N is the total number of points in the aggregated point cloud, and 4 refers to the values (x, y, z, intensity) for each point in the point cloud.

In some embodiments, each point in the aggregated point cloud $PC_{t\_agg}$ 415 is augmented to contain 10 elements instead of 4. For example, the aggregated point cloud $PC_{t\_agg}$ 415 can be stored as a N×10 shaped array. N is the total number of points in the point cloud, and 10 refers to the values (x, y, z, intensity, xc, yc, zc, xp, yp, $t_{lag}$) for each point in the point cloud. Here, xc, yc, zc are defined as the coordinates with respect to the arithmetic mean of all points within a pillar that it belongs to, xp, yp encodes the distance of the pillar from the vehicle origin, and $t_{lag}$ encodes the time lag of the source point cloud to the target point cloud in seconds.

In some embodiments, each point in the aggregated point cloud $PC_{t\_agg}$ 415 is represented by an array of values (x, y, z, i, xc, yc, zc, xp, yp, $t_{lag}$), Here xc, yc, zc are defined as the point coordinates with respect to the arithmetic mean of all points within a pillar to which the points belongs, xp, yp each encodes a respective distance of the pillar from the vehicle origin, and $t_{lag}$ encodes the time lag of the respective source point cloud to the target point cloud in seconds. The distance between a pillar and the vehicle origin is computed based on Euclidian distance.

In some embodiments, the number of elements in the data array for each point in the aggregated point cloud $PC_{t\_agg}$ 415 can be any user-specified number.

The aggregated point cloud $PC_{t\_agg}$ 415 is then sent to the PFN neural network 430 which extracts learned features from pillars of the aggregated point cloud $PC_{t\_agg}$ 415 and generates the BEV image 500 based on the pillars. As noted, a pillar is a voxel corresponding to a point in the aggregated point cloud $PC_{t\_agg}$ 415 with coordinates x, y in the x-y plane and an unlimited spatial extent in the z direction. An example of this approach is described in section 2.1 of Lang, Alex H., et al. "*Pointpillars: Fast encoders for object detection from point clouds*", Proceedings of the IEEE Conference on Computer Vision and Pattern Recognition, 2019 (hereinafter "Pointpillars"). In the described embodiment, the PFN neural network 430 implements the PointNet model to extract learned features from the augmented features for each point in each pillar. As a first step, the aggregated point cloud $PC_{t\_agg}$ 415 is discretized into an evenly spaced grid in the x-y plane, creating a set of pillars. The aggregated point cloud $PC_{t\_agg}$ 415 is first converted into a voxelized point cloud 431, which is then converted to a stacked pillar tensor 433, which is then used to extract a set of learned features 435. In the stacked pillar tensor 433, P is the number of pillars. Each pillar can save N points and D is the feature dimension of each point. The PointNet model is used to extract the features from the N points in each pillar. The learned features 435 can be scattered back to a 2D BEV image 500 with D' learned features. The described implementation of the PFN neural network 430 is just an example, alternative neural network implementations which may use an alternative model can be used to extract learned features from the pillars. For example, the neural neatwork in Pointpillars has an architecture similar to the PFN neural network 430 and may be used instead of the PFN neural network 430 in alternative embodiments.

Both pillars and voxels describe quantitative information at [x, y] location of a point cloud or a tensor. Pillars are generally used to describe information regarding point-wise values at specific locations, whereas the definition of voxels are generalized to any sort of values at a specified [x, y] location of a point cloud.

In the stacked pillar tensor 433, P denotes the number of non-empty pillars in the tensor, N is the maximum number of points per pillar to compute learned features from and is typically user-specified. D is the number of point-wise input values to the PFN neural network 430, which is ten when each point in the aggregated point cloud $PC_{t\_agg}$ 415 is represented by the data array (x, y, z, zc, xp, yp, $t_{lag}$). In the illustrated example in FIG. 4, a pillar in the stacked pillars tensor is defined as an N×10 data array of points.

Figure 5:
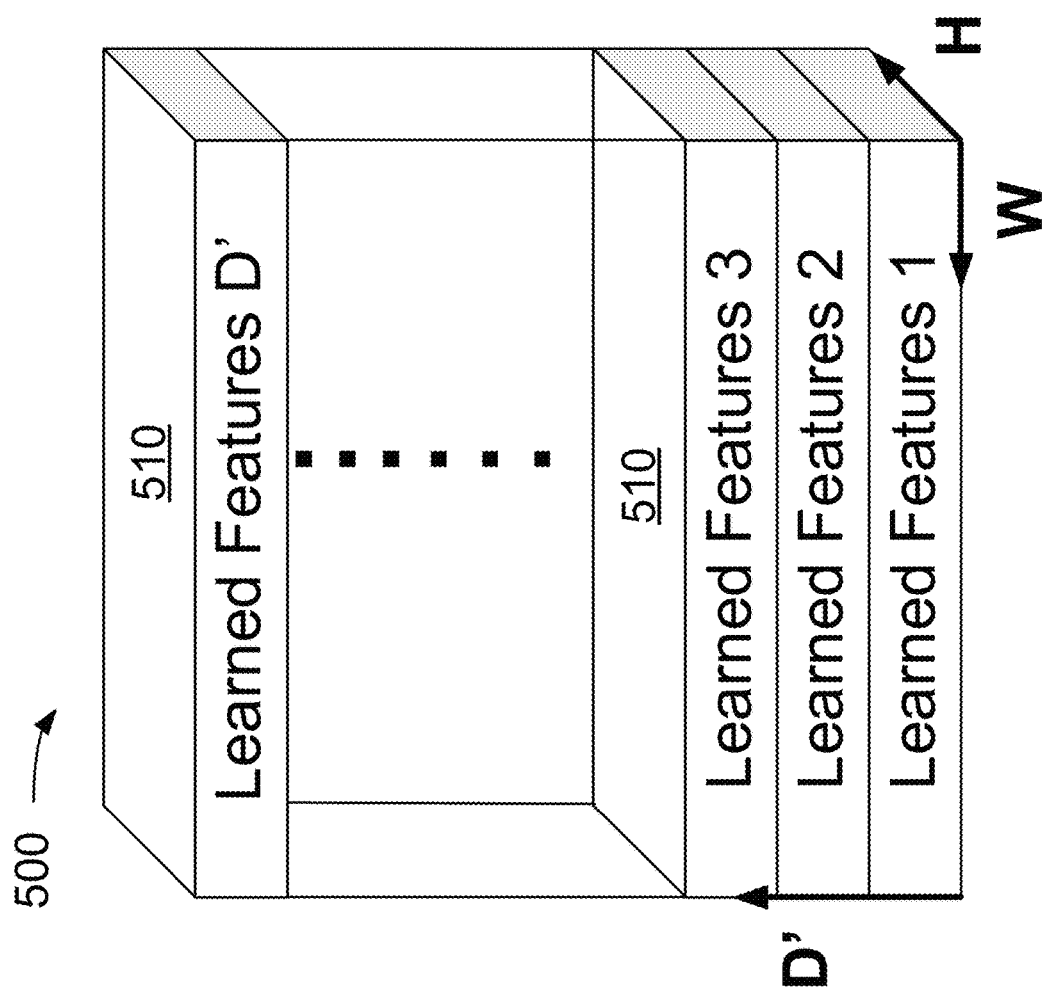
FIG. 5 is an example schematic diagram of an image generated by a PFN in accordance with some example embodiments.

FIG. 5 is an example schematic diagram of an image 500 generated by a PFN neural network 430 in accordance with some example embodiments. The image 500 has D' learned features 510, wherein D' represents the total number of learned features 510 and may be user specified. W and H each indicates the respective number of voxels in the x and y dimension. If the user input requests the system to perform road surface semantic segmentation for an area with a radius of 50 meters around the vehicle, and would like each pixel to be 0.2 m, then there may be 50 m/0.2 m=250 voxels in the x-dimension. Physically speaking, x dimension (W) may correspond to an area in the front or behind the rear of the vehicle, and y dimension (H) may correspond to an area to the left or right of the vehicle.

In some embodiments, the length and width of the pillars can be specified as 0.2 m×0.2 m. If a user chooses to predict 70.4 meters in front of and behind the vehicle, and 40 meters to the left and right of the vehicle, the resolution of the BEV image 500 is then $$(H, W) = \left(\frac{2*40m}{0.2m}, \frac{2*70m}{0.2m}\right) = (400_{px}, 704_{px}).$$

Figure 6:
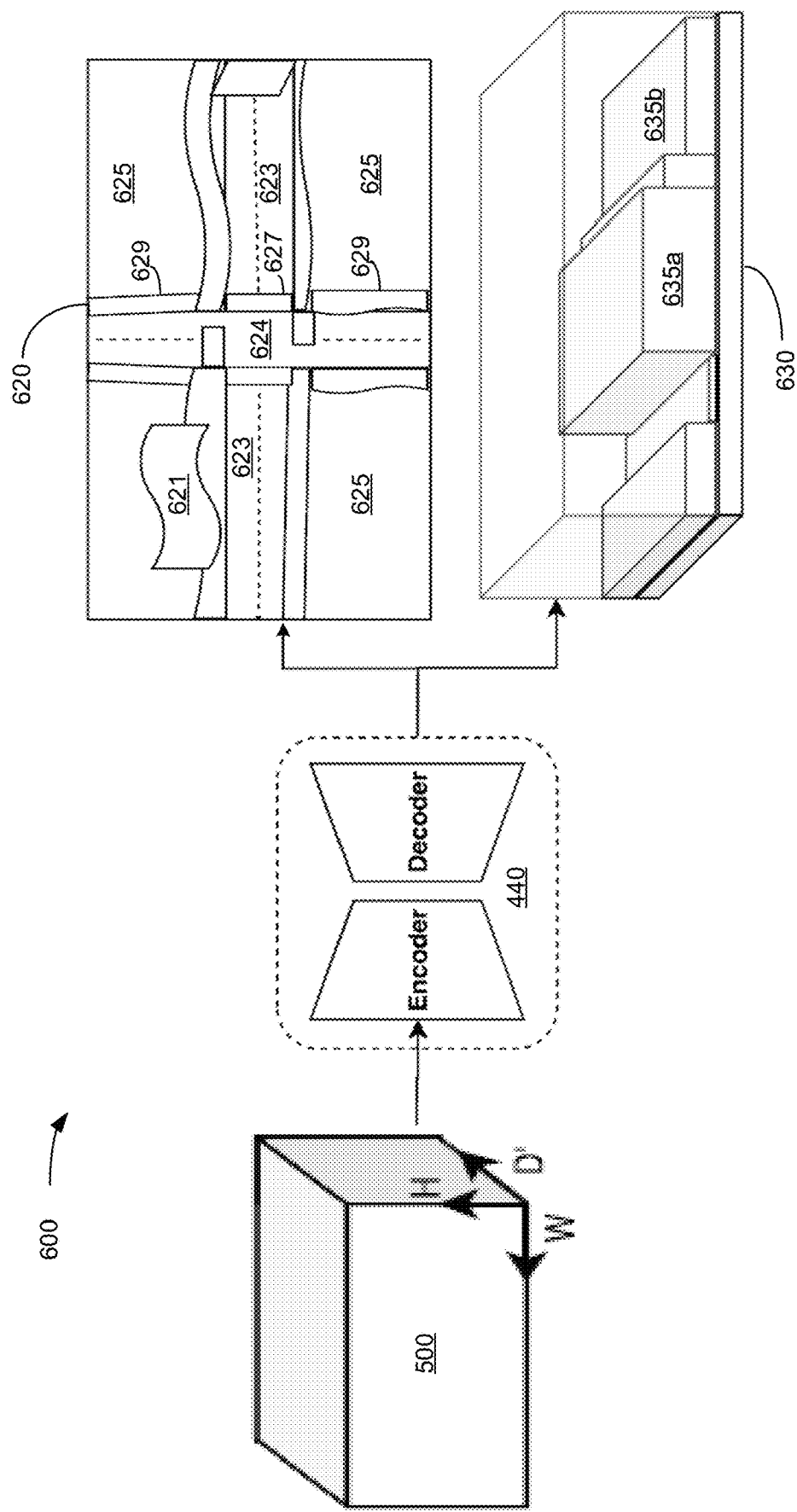
FIG. 6 is a block diagram illustrating an example process by an encoder/decoder network for generating a labelled BEV image in accordance with some example embodiments.

FIG. 6 is a block diagram illustrating an example process 600 performed by the encoder-decoder neural network 440 in accordance with some example embodiments. The input to the encoder-decoder neural network 440 (the "E/D neural network 440") is the BEV image 500 generated by the PFN neural network 430. The E/D neural network 440 generates initial segmentation predictions, which may be in the form of a labelled BEV image 620, wherein each pixel in the labelled BEV image is associated with a class label from a set of class labels. The set of class labels includes road surface class labels and optionally object class labels. The E/D neural network 440 may optionally generate initial elevation predictions, which may be in the form of an elevation map 630. When attempting to segment regions that are distant or partly occluded, the predictions of class labels and elevations from the E/D neural network 440 may have some noise or blur.

The E/D neural network 440 acts as a feature extractor for segmentation and elevation predictions. In some embodiments, the E/D neural network 440 may be implemented as a residual U-Net, a deep fully Convolutional Neural Network (F-CNN) that utilizes residual blocks in the encoder 442 and transposed convolutions (i.e. deconvolutions) in the decoder 445, skip connections between the encoder and decoder blocks to maintain fine-grain details, and implement spatial dropout 2D layers which boost the generalizability of the E/D neural network 440. Detailed implementation may be found in Ronneberger, Olaf, Philipp Fischer, and Thomas Brox, "*U-net: Convolutional networks for biomedical image segmentation,*" International Conference on Medical image computing and computer-assisted intervention, 2015.

The labelled BEV image 620 contains a set of class labels, wherein each pixel in the labelled BEV image is associated with a class label from a set of class labels, the set of class labels including road surface class labels such as background 625, parking lot 621, intersection 624, road 623 (e.g. a road the vehicle is driving on), sidewalk 629, and crosswalk 627. The set of class labels may optionally include object class labels such as a building, a vehicle, a pedestrian, and a bicycle.

In some embodiments, each pixel in the labelled BEV image 620 may be associated with a class label 621, 623, 624, 625, 627, 629. For example, the labelled BEV image 620 may be an RGB image, and a given pixel at position [x, y] of the labelled BEV image 620 may have a data structure [x, y, 1:3], wherein [x, y, 1] contains a value for the color red (R), [x, y, 2] contains a value for the color green (G), and [x, y, 3] contains a value for the color blue (B). Each of the value for R, G or B in the given pixel may be associated with a class label. For instance, a value of 0.3 for R can be associated with a class label of a road (e.g. a road the vehicle is driving on), and a value of 0.5 for B can be associated with a class label of a crosswalk, and a value of 0.7 for G can be associated with a class label of a parking lot, and so on.

In some embodiments, the elevation map 630 may contain a set of refined elevation data 635a, 635b. The elevation map 630 contains estimated height values for each of the pixels in labelled BEV image 620. The estimated height values may be stored in the refined elevation data 635a, 635b. For example, the elevation map 630 may be an RGB image, with the same dimensions as the labelled BEV image 620, and contains the same number of pixels as the labelled BEV image 620. Each pixel in the elevation map 630 may be stored using a data structure in a similar manner as each pixel in the labelled BEV image 620, and the data structure may include a value indicating a height value for the pixel in the elevation map 630, which can be also taken as a height value for a corresponding pixel in the labelled BEV image 620.

In some embodiments, the estimated height value for each pixel may be carried within the respective pixel of the labelled BEV image 620, eliminating the need for a separate elevation map 630. For example, a given pixel in the labelled BEV image 620 may be stored using a data structure [x, y, 1:3], wherein [x, y, 1] contains a value for the color red (R), [x, y, 2] contains a value for the color green (G), and [x, y, 3] contains a value for the color blue (B). Each of the value for R, G or B in the given pixel may be associated with a class label or a height value. For instance, a value of 0.3 for R can be associated with a class label of a road (e.g. a road the vehicle is driving on), and a value of 0.5 for B can be associated with a class label of a crosswalk, and a value of 0.7 for G can be associated with a height value H meters, wherein H is computed based on the value for G. For instance, the value of 0.7 for G may be used to multiply a maximum height value of 100 meters, and the resulting height value H may be 100*0.7=70 meters.

Figure 8:
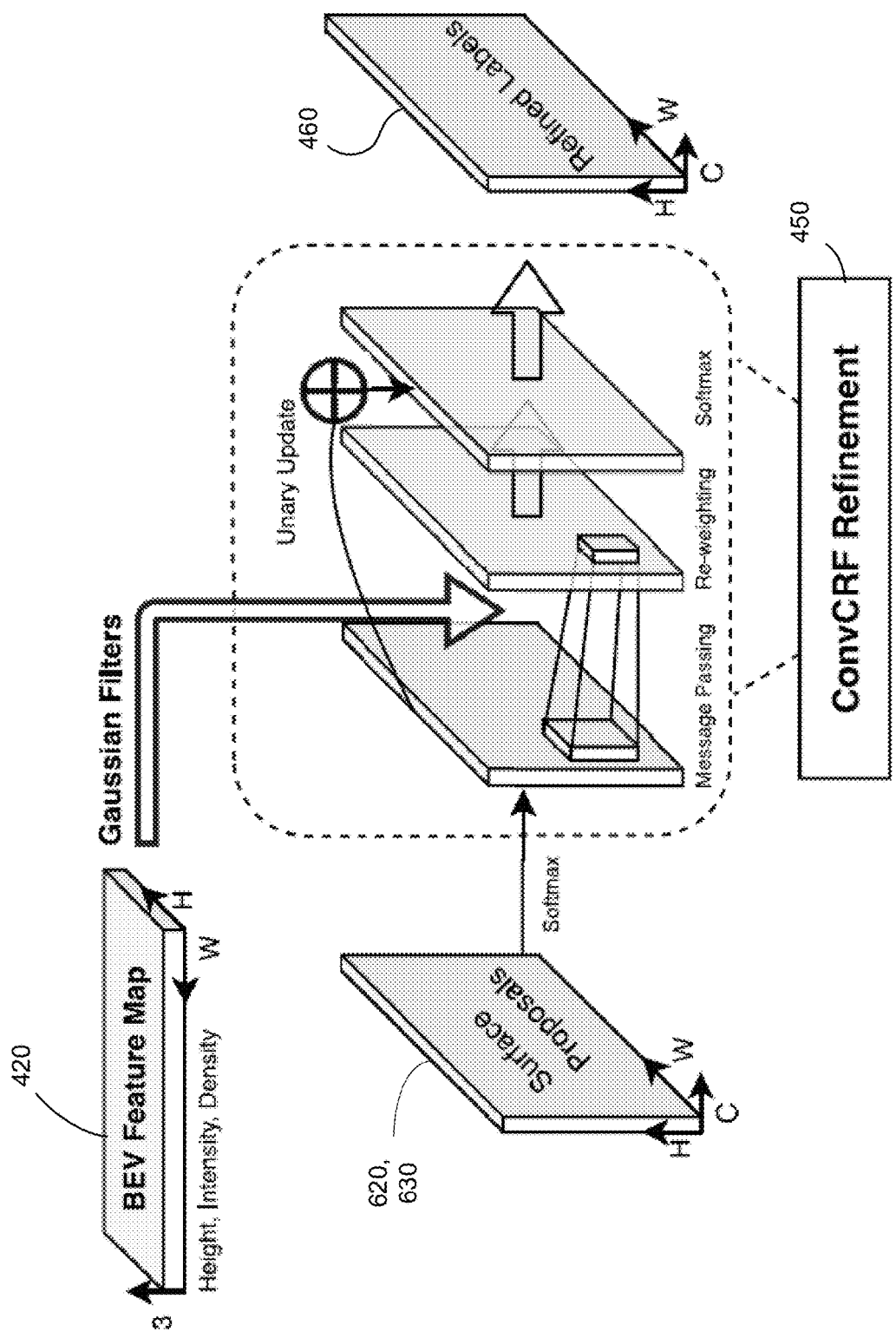
FIG. 8 is a block diagram illustrating an example process by a ConvCRF refinement network for generating a refined labelled BEV image in accordance with some example embodiments.

FIG. 8 is a block diagram illustrating an example process performed by a ConvCRF neural network 450 for generating one or more refined labels 460 for a refined labelled BEV image 320 in accordance with some example embodiments by smoothing the labelled BEV image using the BEV feature map 420. The BEV feature map 420 is generated from the voxelized point cloud 431, which is generated by the aggregated point cloud $PC_{t\_agg}$ 415. The voxelized point cloud 431 defines a set of pillars, wherein each pillar in the set of pillars is a voxel corresponding to a point in the aggregated point cloud with coordinates x, y in the x-y plane and an unlimited spatial extent in the z direction.

In the shown embodiment, the same voxelized point cloud 431 is used to generate the BEV feature map and the BEV image 500. However, in other embodiments the voxelized point cloud used to generate BEV feature map 420 may be a voxelized point cloud than that used to generate the BEV image 500 but using the same or similar technique. The BEV feature map 420 may include three channels or a data structure having three elements, one each for height, intensity and density. The BEV feature map 420 is generated by a rules-based method. In one example, the height of a pixel in the BEV feature map 420 is determined as the difference between points in a pillar having a maximum and a minimum elevation, the intensity of a pixel in the BEV feature map 420 is determined as a mean of the intensity of the corresponding points in a pillar, and the density of a pixel in the BEV feature map 420 is determined as the number of points in the respective pillar.

In the described embodiment, smoothing the labelled BEV image 620 comprises performing Gaussian kernel smoothing on the labelled BEV image using the BEV feature map 420 in the described embodiment. The Gaussian kernel smoothing comprises generating Gaussian kernels based on the BEV feature map 420 and the class labels of the labelled BEV image 620, and smoothing the labelled BEV image 620 with the Gaussian kernels to generate the refined labelled BEV image 320.

In one example embodiment, for each voxel in the BEV feature map 420, the average height of the points in the voxel, the average intensity of the points in the voxel, and the density of points in the voxel may be encoded in the BEV feature map 420. Through a message passing function in the ConvCRF neural network 450, Gaussian kernels, which contain weights, can be computed based on the BEV feature map 420 and the unary label and optionally elevation prediction. The number and size of the Gaussian kernels are hyperparameters whose value is used to control the learning process. In one example, 32 Gaussian kernels each with a size of 5 (pixels)×5 (pixels) are used. The Gaussian kernels are then used to re-weigh the labelled BEV image 620 (and optionally the elevation map 630), and the re-weighed results are normalized with a final Softmax layer of the ConvCRF neural network 450. The output of the ConvCRF neural network 450 is the refined labelled BEV image 320. Optionally, the refined elevation map 330 may also be output by the ConvCRF neural network 450.

During training of the ConvCRF neural network 450, the Gaussian $$k(f_i^I, f_j^I) := w^{(1)}\exp\left(-\frac{|p_i - p_j|^2}{2\theta_\alpha^2} - \frac{|I_i - I_j|^2}{2\theta_\beta^2}\right) + w^{(2)}\exp\left(-\frac{|p_i - p_j|^2}{2\theta_\gamma^2}\right)$$

kernels are learned through backpropagation, as described below in detail. The function of the Gaussian kernels is to quantify the similarity of two nearby pixels in the BEV feature map 420 using height, density, intensity information, and distance from each other, based on a similarity function. In some embodiments, the similarity function is defined by the following equation below:

wherein $k(f_i^I, f_j^I)$ is a computed similarity between Gaussian kernel for the $i^{th}$ and $j^{th}$ pixels, $p_i$ and $p_j$ are the pixel coordinates (e.g., [2, 3] and [4, 4]) of the $i^{th}$ and $j^{th}$ pixels, and $I_i$ and $I_j$ are features of the $i^{th}$ and $j^{th}$ pixels (e.g., height, density, intensity features at location [2, 3] and [4, 4] in the BEV feature map 420), and $\theta_+^2$, $\theta_\beta^2$, $\theta_\gamma^2$, $w^{(1)}$, $w^{(2)}$ are learned coefficients wherein $w^{(1)}$, $w^{(2)}$ are the weights of the similarity function. Once all the Gaussian kernels are computed, the Gaussian kernels are used to adjust the weights of the neurons of the ConvCRF neural network 450 through backpropagation by minimizing one or more loss functions, examples of which are described below. Since the computed similarity between Gaussian kernels indicates a similarity between nearby pixels based on the BEV features and relative distance (e.g., within a square window of a user specified size), the ConvCRF neural network 450 can adjust the predictions of two similar pixels to reduce noise. The weights of the PFN neural network 430, the E/D neural network 440, and/or the ConvCRF network 450 may be optimized together, as described more fully below.

Figure 7A:
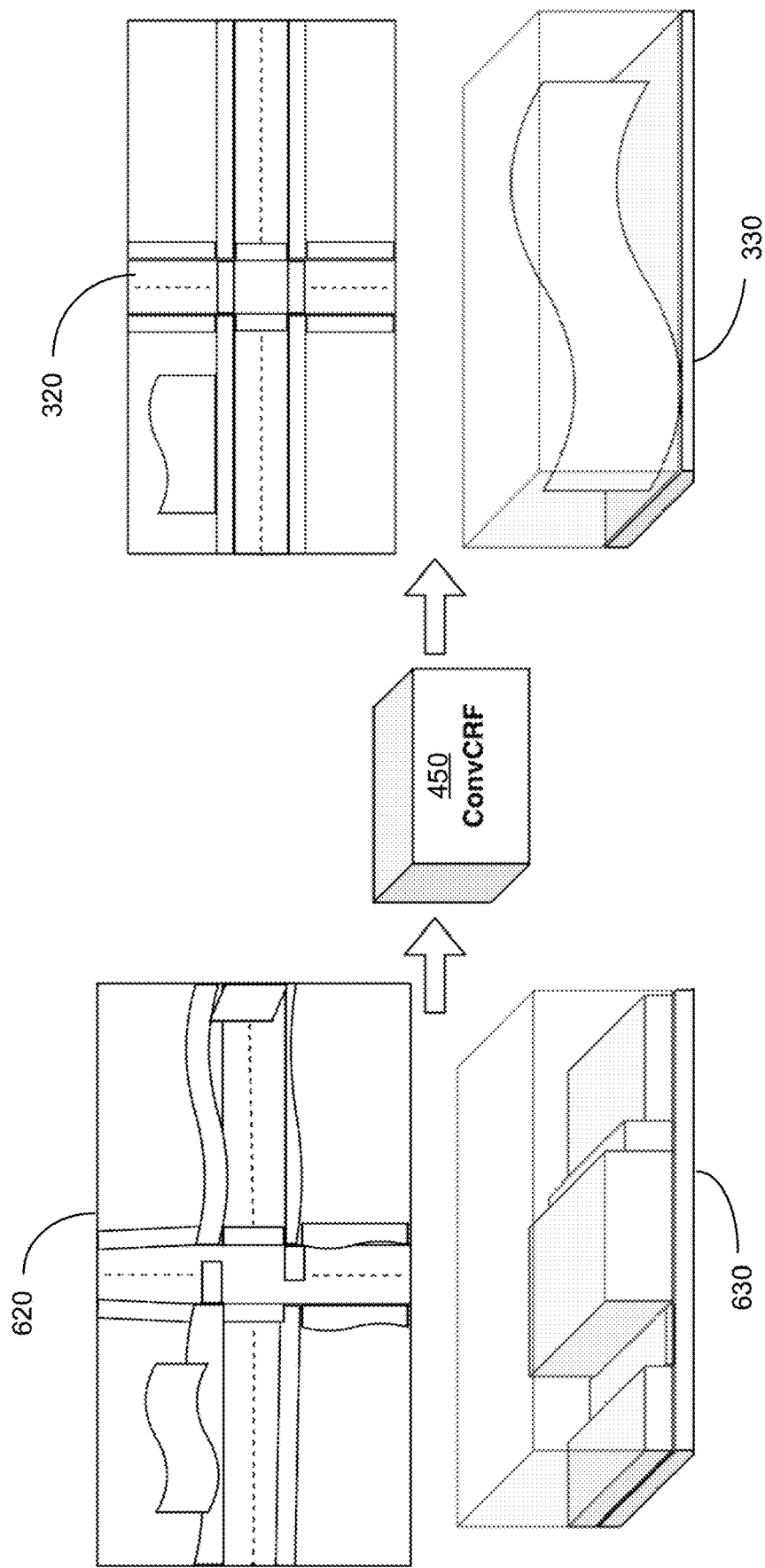
FIG. 7A shows an example ConvCRF refinement process in accordance with some example embodiments.

FIG. 7A shows an example ConvCRF neural network 450 in accordance with some example embodiments. Specifically, the labelled BEV image 620 and optionally the elevation map 630, is sent to a ConvCRF neural network 450 to produce final segmentation and optionally elevation predictions. In addition to the E/D neural network 440 which models the conditional distribution of each individual pixel given the BEV image 500, the ConvCRF neural network 450 is implemented to model the joint distribution between nearby pixels conditioned on the BEV image 500. By doing so, the ConvCRF neural network 450 is configured to refine the labelled BEV image 620 and optionally the elevation map 630 to output both smooth and precise segmentation results, namely, the refined labelled BEV image 320, and optionally the refined elevation map 330. An example implementation of a ConvCRF process is described in Teichmann, Marvin TT, and Roberto Cipolla, "*Convolutional CRFs for semantic segmentation*," arXiv preprint arXiv:1805.04777, 2018.

In some embodiments, the ConvCRF neural network 450 aims to maximize the probability of a Gibbs Distribution by optimizing an energy function shown in FIG. 7B. The energy function contains both a unary potential and a pairwise potential term. The unary potential can be provided by the E/D neural network 440, so the ConvCRF neural network 450 computes the pairwise potential and uses it to update the unary label optionally elevation prediction—a process referred to as refinement. The pairwise potential (see expanded equation below) models the interaction between two pixels if and only the Manhattan distance between the two pixels is within K, wherein K is a predefined kernel size of the Gaussian kernels.

$$\psi_p(\hat{x}_i, \hat{x}_j | I) =$$

$$\mu(\hat{x}_i \neq \hat{x}_j) \left\{ w^{(1)} \exp\left(-\frac{|p_i - p_j|^2}{2\theta_\alpha^2} - \frac{|f_i - f_j|^2}{2\theta_\beta^2}\right) + w^{(2)} \exp\left(-\frac{|p_i - p_j|^2}{2\theta_\gamma^2}\right) \right\}$$

Learned Coefficients: $\theta_\alpha^2, \theta_\beta^2, \theta_\gamma^2, w^{(1)}, w^{(2)}$ Strong Conditional Independence Assumption for ConvCRF $\psi_p(\hat{x}_i, \hat{x}_j / I) = 0$ for manhattan$(i,j) > K$ K=kernel size wherein $f_i$ and $f_j$ are the feature of the $i^{th}$ and $j^{th}$ points, $p_i$ and $p_j$ are the spatial coordinates of the $i^{th}$ and $j^{th}$ points, and $\theta$ and w are learned coefficients.

In simpler terms, the ConvCRF neural network 450 aims to enforce consistency of predictions of class labels and optionally elevation between nearby pixels that have similar features. Thus, the encoded features of each pixel are quite important, since the ConvCRF neural network 450 utilizes them as a prior for refinement. Normally, the pixel-wise RGB values of images are used as the prior for refinement of class label predictions optionally elevation predictions for pixels in the image. However, in the example embodiments described herein, the use of the pixel-wise RGB values of images are different, since the aim here is to refine BEV road segments as opposed to image segments.

Figure 9:
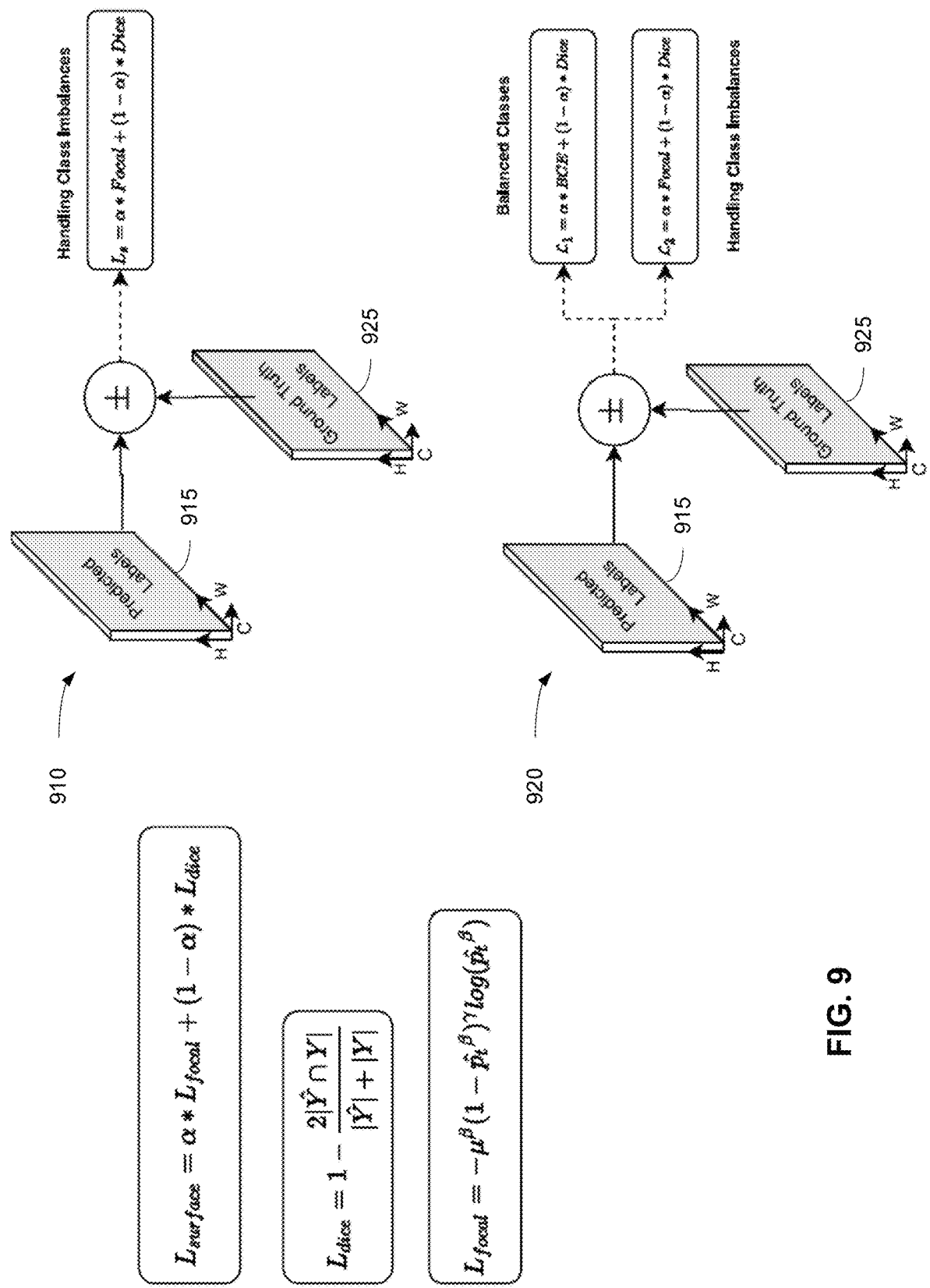
FIG. 9 shows example training processes of CNNs used in the process shown in FIG. 4 for performing road surface semantic segmentation in accordance with some example embodiments.

FIG. 9 shows example training processes 910, 920 of the neural networks used in the process shown in FIG. 4 for performing semantic segmentation of a sequence of point clouds in accordance with some example embodiments. The training processes 910, 920 may include training the PFN neural network 430, the E/D neural network 440 and/or the ConvCRF neural network 450.

During a training epoch, the PFN neural network 430, E/D neural network 440, ConvCRF neural network 450 may predict class labels such as a road surface class label and optionally elevations for each pixel in a BEV image of the environment a refined elevation map 330 including refined labels 460. The refined labels 460 are the predicted class labels 915, which are used to compute a pixel-wise loss in a supervised fashion in the training process 910, based on ground truth class labels, and elevation data. The ground truth class labels 925 may include tensors or matrix generated directly from the point cloud dataset 212, and include information representing the respective class label with which each pixel may be associated.

For example, a ground truth class label 925 can include a ground-truth tensor at pixel location [2, 3], the tensor may have a value of 2, which indicates that the pixel at location [2, 3] belongs to a sidewalk, as the class label of "sidewalk" is predefined to be represented by the label value 2. Each value for a ground truth class label 925 may be an integer corresponding to a class label. In the case of elevation ground truth class labels, each ground truth class label may have a value between [0, 1], which would correspond to a height value between a predefined minimum height and a predefined maximum height.

The computation of a pixel-wise loss can be used to train the PFN neural network 430, the E/D neural network 440, and the ConvCRF network 450 through backpropagation, by refining one or more weights of the neurons in the PFN network, the E/D network and the ConvCRF network 450 based on the computed loss. For the task of semantic segmentation, a weighted loss $L_{surface}$ that combines the focal loss $L_{focal}$ and dice coefficient loss $L_{dice}$ may be used during training to fine-tune the weights of the neurons of the PFN neural network 430, E/D neural network 440, and the ConvCRF network 450, based on the equations below:

$$L_{surface} = \alpha * L_{focal} + (1-\alpha) * L_{dice} \quad (1)$$

Similar to standard binary cross entropy (BCE) loss, which sums or averages the negative log-likelihood of each pixel class label prediction and optionally elevation prediction being correct, the focal loss $L_{focal}$ further multiplies the negative log-likelihood with a class-specific weight and a modulating factor, based on the equation below:

$$L_{focal} = -\mu^\beta (1-\hat{p}_t^\beta)^\gamma \log(\hat{p}_t^\beta),$$

wherein $\beta$ is the ground truth class label for a given pixel, $\mu^\beta$ is the class-specific weight, and $(1-p_t^\beta)$ is the modulating term. The modulating term reduces the penalty of pixels that are predicted correctly with high confidence. This tends to occur for classes that are over-represented in the given training data, for example, the class label for "road". In turn, the penalty accumulated for under-represented classes such as crosswalks or sidewalks will be higher. This confidence-based scaling of pixel-wise losses enables the PFN neural network 430, the E/D neural network 440, and the CFN network 450 to learn in a balanced manner, despite the unbalanced representation of the classes within the training dataset.

The dice coefficient loss is based on the dice coefficient which is an overlap measure very similar to Intersection Over Union (IOU), based on the equation below:

$$L_{dice} = 1 - \frac{2|\hat{Y} \cap Y|}{|\hat{Y}| + |Y|}.$$

For the most part, surfaces of roads ("road surfaces") are composed of long segments that span across the width or height of a BEV image. Because of this, if the vehicle turns slightly to the left or to the right, the deviation of the road surface near the end of the BEV image can be quite significant. Hence, in the case of road surface semantic segmentation, the orientation of the class label predictions is an important factor. Therefore, by combining the focal loss $L_{focal}$ with the dice coefficient loss $L_{dice}$, the scale of the two losses can be adjusted to emphasize an optimization based on either local pixel-wise accuracy based on focal loss $L_{focal}$ or global orientation capture based on the dice coefficient loss $L_{dice}$, as described in more detail below.

In one example embodiment, the alpha-weight term, $\alpha$ of the loss function (1) is set to a value of 0.75, i.e., $\alpha$=0.75. An interpretation of this scaling is that 75% of the training emphasis is put on the focal loss $L_{focal}$, and 25% focus on the dice coefficient loss $L_{dice}$. However, the learning focus of the PFN neural network 430, the E/D neural network 440, and the ConvCRF neural network 450 also depend on the magnitude of the values computed for each loss, so in some embodiments, μ=0.25 may be specified for positive examples (e.g. any class label other than background), with a modulating factor γ=2.

The custom loss function shown above in equation (1) is tailored to increase the accuracy of a system which generates a road surface semantic segmentation map from a sequence of point clouds. The focal loss term $L_{focal}$ optimizes the neural networks 430, 440, 450 for local pixel accuracy while handling class imbalanced in the given training data. The dice coefficient loss La., puts optimization focus on global orientation capture or road segments in order to maximize the IOU measure. The alpha-balanced combination of these losses allows the model to achieve both goals simultaneously. By setting the alpha-weight term α=0.75, slightly more emphasis is put on optimizing for local pixel-wise features, allowing the combined CNN model to pay attention to fine details such as spacings between road segments, which could potentially get overlooked if the dice coefficient loss $L_{dice}$ is weighted too highly.

Figure 10:
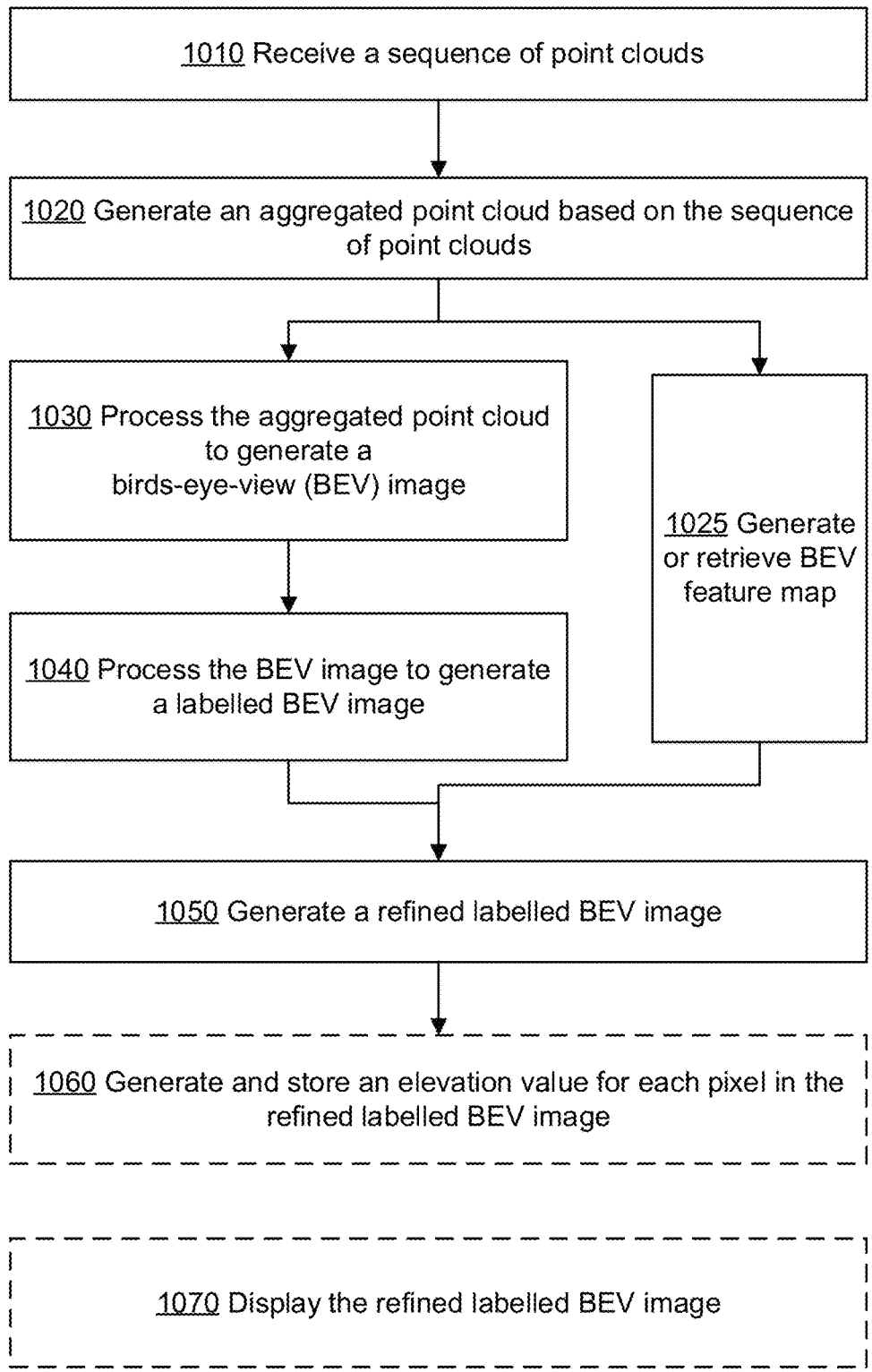
FIG. 10 is a method performed by a computing system for performing semantic segmentation in accordance with some example embodiments.

FIG. 10 is an example method 1000 performed by a computing system 200 for generating a road surface semantic segmentation map in accordance with some example embodiments.

At step 1010, the system 200 receives a sequence of point clouds 100, each of the sequence of point clouds 100 representing a three-dimensional (3D) scan of an environment. The point clouds 100 may be arranged in a chronological order based on its respective timestamp. Each point cloud 100 includes a number of points, each of which may be represented by a set of coordinates (x, y, z) within the point cloud 100 along with a vector of other values, such as an intensity value indicating the reflectivity of the object corresponding to the point. Each point represents a reflection of a laser at a point in space relative to the LIDAR sensor. The point cloud 100 with the most recent timestamp t is referred to as the target point cloud $PC_t$.

At step 1020, the system 200 generates an aggregated point cloud $PC_{t\_agg}$ 415 based on the sequence of point clouds 100. In some embodiments, a target re-projection sub-process 410 may be implemented to use a sliding window buffer to generate the aggregated point cloud $PC_{t\_agg}$ 415. A sliding window buffer can be interpreted as a queue-like data structure that is parameterized by two variables, m and w: m is defined as the frequency at which a new element is enqueued and the oldest element is dequeued from the sliding window buffer, and the total number of elements in the fixed sized sliding window buffer is specified by the variable w, known as the window size parameter. In some embodiments, values m and w can be selected empirically or based on a defined set of metrics.

Each element in the sliding window buffer is a point cloud 100. At a specific given timestamp t, all the point clouds within the sliding window buffer form the dataset 212. The point clouds 100 are stored chronologically (i.e., sequentially from newest to oldest), from $PC_t$, which is the most recent point cloud 100, to $PC_{t-w+1}$, which is the oldest point cloud 100, wherein w is the total number of point clouds in the sliding window buffer or dataset 212 at given time t. At t, which is known as the inference time, all the point clouds 100 within the sliding window buffer are aggregated, via sub-process 410, to generate one dense point cloud, known as the aggregated point cloud $PC_{t\_agg}$ 415. In some embodiments, to account for motion of the vehicle between point cloud frames, all point clouds in the sliding window buffer except the most recent point cloud $PC_t$, which include $PC_{t-1}$ to $PC_{t-w+1}$ (also referred to as the source frames) are re-projected into the frame of reference of the most recent point cloud $PC_t$.

For example, the aggregated point cloud $PC_{t\_agg}$ 415 can be generated based on the equation:

$$PC_{t\_agg} = \bigcap_{i=1}^{w} \tau_{1,i} PC_i$$

w is the window size parameter; the point cloud $PC_t$ having a most recent timestamp in the sequence of points clouds is a target point cloud; each point cloud from $PC_{t-1}$ to $PC_{t-w+1}$ having a timestamp earlier than the most recent timestamp in the sequence of points clouds 212 is a source point cloud; $\xi_{1,i}$ represents a homogenous transformation between the target point cloud $PC_t$ and each respective source point cloud i; and $PC_i$ is the respective source point cloud i.

The homogenous transformation between the target point cloud (e.g., $PC_t$) and each respective source point cloud i (e.g., $PC_{t-1}$ or $PC_{t-w+1}$) can be computed, provided with the pose information from the vehicle's odometry system. A homogenous transform refers to translating and rotating a point cloud in one point cloud at a first timestamp to another point cloud at a second timestamp, to accommodate for the movement of the vehicle with the LIDAR sensor between the first timestamp and the second timestamp.

At step 1025, the system 200 generates the BEV feature map 420. In some embodiments, the BEV feature map 420 is generated from the voxelized point cloud 431. The BEV feature map 420 may include a data structure having three elements (or channels): one each for height, intensity and density.

In one example embodiment, for each voxel in the BEV feature map 420, the average height of the points in the voxel, the average intensity of the points in the voxel, and the density of points in the voxel are encoded in the BEV feature map 420. The technical benefits of the combined usage of the sliding window buffer and the PFN neural network 430 are: (1) overcoming the sparsity of only one or very few point clouds; and (2) extracting learned features from the points in the entire sequence of point clouds.

The radial scanning procedure of LIDAR sensors tend to result in a larger separation between adjacent points with increasing distance. This contributes to point cloud sparsity at farther distances, which with limited information, makes accurate prediction at long range a challenge. In addition, the use of only one point cloud makes such a system susceptible to the effects of occlusion (e.g., when a nearby car or truck occludes the road surface). This problem may still persist if several point clouds taken within a small interval of time (e.g. 300 ms) are used, as there will be no significant change to the environment. Thus, the effect of the frequency parameter m in the sliding window is of great import.

In general, the closer occlusive objects are to the LIDAR sensor, the more points are reflected by these occlusive objects, and less salient information is captured from actual road surfaces. Hence, in addition to densifying the point cloud, using a sliding window of point clouds may successfully circumvent the issue of occlusion by capturing information across several timestamps in a reasonable time period. With a sequence of point clouds 100, there is a strong likelihood of dynamic objects moving away from the vehicle, allowing for not only a denser point cloud, but also a point cloud richer in salient information. In one embodiment, parameters are selected such that m=2 Hz and a window size of w=5. With this configuration, the sequence of point clouds 100 are separated by 500 ms. Hence, point cloud information captured over $$w * \frac{1}{m \text{ Hz}} = 5 * 500\text{ms} = 2.5s$$

are used in computing the aggregated point cloud $PC_{t\_agg}$ 415.

As most existing solutions on road segmentation construct a hand-crafted BEV input from a single point cloud scan, the use of the PFN neural network 430 allows for the system 200 to learn which features are important from point cloud pillars with a mini-PointNet model, using a linear layer to map D point features to D' learned features. Thus, the PFN neural network 430 can automatically construct the input, i.e., the BEV image 500, for the E/D neural network 440 at step 1030 based on the aggregated point cloud $PC_{t\_agg}$ 415.

The resolution of the BEV image 500 depends on both the defined spatial extents for prediction and the pillar/voxel size. Intelligent selection of these parameters can lead to efficient performance of the system 200. Since most modern LIDAR sensors have a usable range of approximately 70 m, it is practical to predict 70.4 m both in front of and behind the vehicle. In addition, the standard width of a road lane is 3.7 m, it is also reasonable to specify a prediction of 40 m to the left and right of the vehicle, allowing the final output of the system 200 to easily handle eight lane roads or highways with additional room for parking lots.

Therefore, the final predictions are specified to be rectangular, having the dimensions of (H,W)=(80 m, 140.8 m). Since the resolution of the BEV image 500 is defined by $$(r_H, r_W) = \left(\frac{H}{v_y}, \frac{W}{V_x}\right),$$

selecting a smaller pillar/voxel height ($v_y$) and width ($v_x$) can increase the resolution of BEV image 500 (i.e., with more pixels), slowing down the forward-pass of the E/D neural network 440. However, selecting a pillar/voxel that is too large will result in a coarse BEV image 500 that lacks fine-grain detail, negatively impacting the performance of the network. Therefore, a practical and efficient selection may be ($v_y$, $v_x$)=(0.2 m, 0.2 m), as this setting allows for the capture of detailed point cloud information without significantly degrading the speed of the forward-pass network. Thus, resolution of the BEV image 500 can be ($r_H$, $r_W$)= (400px, 704px).

The combination of the sliding window buffer and the PFN neural network 430 allows for the construction of a learned BEV input for the E/D neural network 440 in the form of a BEV image 500 from rich and dense point clouds, overcoming the issues of sparsity, occlusion, and manual hand-crafted inputs.

At step 1040, the system 200 processes the BEV image 500 to generate a labelled BEV image 620, wherein each pixel in the labelled BEV image 620 is associated with a class label from a set of class labels, the set of class labels including road surface class labels (e.g. a road, a lane, a sidewalk, an intersection, a crosswalk, etc.) and optionally object class labels (e.g. vehicle, pedestrian, building, bicycle, etc.).

In some embodiments, each pixel in the labelled BEV image 620 may be associated with a class label 621, 623, 624, 625, 627, 629. For example, the labelled BEV image 620 may be an RGB image, and a given pixel at position [x, y] of the labelled BEV image 620 may have a data structure [x, y, 1:3], wherein [x, y, 1] contains a value for the color red (R), [x, y, 2] contains a value for the color green (G), and [x, y, 3] contains a value for the color blue (B). Each of the value for R, G or B in the given pixel may be associated with a surface segmentation type represented by a class label. For instance, a value of 0.3 for R can be associated with a class label of a driving road, and a value of 0.5 for B can be associated with a class label of a crosswalk, and a value of 0.7 for G can be associated with a class label of a parking lot, and so on.

Step 1040 may be performed by an E/D neural network 440, which may include an encoder 442 and a decoder 445. In some embodiments, the E/D neural network 440 may be implemented as a residual U-Net, a deep fully Convolutional Neural Network (F-CNN) that utilizes residual blocks in the encoder 442 and transposed convolutions in the decoder 445, skip connections between the encoder and decoder blocks to maintain fine-grain details, and implement spatial dropout 2D layers which boost the generalizability of the E/D neural network 440.

At step 1050, the system 200 generates a refined labelled BEV image 320 based on the labelled BEV image 620 and the BEV feature map 420, wherein each pixel in the refined labelled BEV image 320 is associated with a class label from the set of class labels. For example, the refined labelled BEV image 320 can contain a set of refined labels 460, which may include labels such as background 340, parking lot 350, intersection 360, road 370, pedestrian walk 380, and crosswalk 390. The labels 460, 340, 350, 360, 370, 380, 390 may also be referred to as class labels. The set of refined labels 460 may optionally include object class labels such as a building, a vehicle, a pedestrian, and a bicycle.

In some embodiments, each pixel in the refined labelled BEV image 320 may be associated with a class label. For example, the refined labelled BEV image 320 may be an RGB image, and a given pixel at position [x, y] of the refined labelled BEV image 320 may have a data structure [x, y, 1:3], wherein [x, y, 1] contains a value for the color red (R), [x, y, 2] contains a value for the color green (G), and [x, y, 3] contains a value for the color blue (B). Each of the value for R, G or B in the given pixel may be associated with a surface segmentation type represented by a class label. For instance, a value of 0.3 for R can be associated with a class label of a driving road, and a value of 0.5 for B can be associated with a class label of a crosswalk, and a value of 0.7 for G can be associated with a class label of a parking lot, and so on.

In some embodiments, step 1050 may be performed by a ConvCRF neural network 450. Often, predicting at long ranges amounts to a portion of noise in the final outputs of E/D neural network 440. As explained above, the ConvCRF neural network 450 introduces a pairwise potential term to model the joint distribution of nearby pixels given a unary and a prior. The ConvCRF neural network 450 can be extended to BEV segmentation with a hand-crafted BEV feature map 420 from step 1025a. The ConvCRF neural network 450 allows for fast refinement by convolutions in a BEV space as compared to traditional CRFs, reducing the noise of predictions in long range or partly occluded regions. In some example embodiments, three types of information from the BEV feature map 420, namely, the average height of points, average intensity of points, and density of points within a given BEV voxel are used by the ConvCRF neural network 450 to refine the labelled BEV image 620. This configuration provides the ConvCRF neural network 450 with a strong prior for refinement by leveraging spatial, reflectance, and point distribution properties of a given point cloud.

At step 1060, the system 200 may, as an option, generate and store an elevation value 335 for each pixel in the refined labelled BEV image 320. For example, the estimated height value for each pixel may be carried within the respective pixel of the refined labelled BEV image 320. For example, a given pixel in the refined labelled BEV image 320 may be stored using a data structure [x, y, 1:3], wherein [x, y, 1] contains a value for the color red (R), [x, y, 2] contains a value for the color green (G), and [x, y, 3] contains a value for the color blue (B). Each of the value for R, G or B in the given pixel may be associated with a class label or a height value. For instance, a value of 0.3 for R can be associated with a class label of a road (e.g. a road the vehicle is driving on), and a value of 0.5 for B can be associated with a class label of a cross walk, and a value of 0.7 for G can be associated with a height value H meters, wherein H is computed based on the value for G. For instance, the value of 0.7 for G may be used to multiply a maximum height value of 100 meters, and the resulting height value H may be 100*0.7=70 meters.

At step 1070, the system 200 may optionally display the refined labelled BEV image on a display of a computing system, which may be a computing system carried by, or embedded in, an autonomous vehicle.

The described embodiments can be generalized to predict more than class labels, in particular road surface class labels, and elevation. For example, the embodiments can be implemented to predict a smoothness or slipperiness of a surface. Generally speaking, provided the proper training data, the embodiments can be extended to predicting any surface property in a BEV image provided that the property is correlated to the position and intensity information that is provided by a LIDAR sensors in the form of 3D point clouds.

Since this system 200 can be implemented as an online standalone mode, it requires minimal effort to integrate with any system with an on-board LIDAR sensor. Furthermore, the unique configuration of the system's various networks and modules enables transferability to domains that are far more complex than road-like surfaces. For instance, off-road rovers can benefit from surface and elevation prediction for navigation purposes, and low-flying drones can use the invention for large scale mapping tasks.

The steps (also referred to as operations) in the flowcharts and drawings described herein are for purposes of example only. There may be many variations to these steps/operations without departing from the teachings of the present disclosure. For instance, the steps may be performed in a differing order, or steps may be added, deleted, or modified, as appropriate.

General

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method of generating a road surface segmentation map, comprising:
 receiving a sequence of point clouds, each respective point cloud of the sequence of point clouds representing a three-dimensional (3D) scan of an environment at a different point in time;
 generating an aggregated point cloud based on the sequence of point clouds;
 generating, via a first neural network, a birds-eye-view (BEV) image of the environment from the aggregated point cloud, wherein the first neural network is a Pillar Feature Net (PFN) neural network;
generating, via a second neural network, a labelled BEV image from the BEV image, wherein each pixel in the labelled BEV image is associated with a class label from a set of class labels, wherein the second neural network is an encoder/decoder (E/D) neural network;
generating a BEV feature map
generating, via a third neural network, the road surface segmentation map in the form of a refined labelled BEV image based on the labelled BEV image by smoothing the labelled BEV image using the BEV feature map, wherein each pixel in the refined labelled BEV image is associated with a class label from the set of class labels, wherein the third neural network is a Convolutional Conditional Random Field (ConvCRF) neural network; and
training the PFN neural network, the E/D neural network and the ConvCRF neural network by, during each training epoch:
generating a plurality of predicted labels by the PFN neural network, the E/D neural network and the ConvCRF neural network;
receiving or retrieving a plurality of ground truth labels;
computing a loss based on the plurality of ground truth labels and the plurality of predicted labels; and
refining one or more weights in the PFN neural network, the E/D neural network and the ConvCRF neural network based on the loss.

2. The method of claim 1, wherein the BEV feature map is generated based on a set of pillars generated from the aggregated point cloud, wherein each pillar in the set of pillars is a voxel corresponding to a point in the aggregated point cloud with coordinates x, y in the x-y plane and an unlimited spatial extent in the z direction.

3. The method of claim 2, comprising:
generating the set of pillars generated from the aggregated point cloud.

4. The method of claim 1, wherein the BEV feature map defines three elements for each pixel in the BEV image, the three elements being each height, intensity and density.

5. The method of claim 4, wherein the height of a pixel in the BEV feature map represents the difference between points in a pillar having a maximum and a minimum elevation, the intensity of a pixel in the BEV feature map represents a mean of the intensity of the corresponding points in a pillar, and the density of a pixel in the BEV feature map represents the number of points in the respective pillar.

6. The method of claim 1, wherein the smoothing comprises performing Gaussian kernel smoothing on the labelled BEV image using the BEV feature map, the Gaussian kernel smoothing comprising:
generating Gaussian kernels based on the BEV feature map and the class labels of the labelled BEV image; and
smoothing the labelled BEV image with the Gaussian kernels to generate the refined labelled BEV image.

7. The method of claim 1, further comprising:
generating and storing an elevation value for each pixel in the refined labelled BEV image based on the labelled BEV image.

8. The method of claim 1, wherein generating the aggregated point cloud is based on an equation:

$$PC_{t\_agg} = \bigcap_{i=1}^{w} \tau_{1,i} PC_i$$

wherein:
PC$_{t\_agg}$ represents the aggregated point cloud;
w is a window size parameter;
the point cloud having a most recent timestamp in the sequence of points clouds is a target point cloud;
each point cloud having a timestamp earlier than the most recent timestamp in the sequence of points clouds is a source point cloud;
$\tau_{1,i}$ represents a homogenous transformation between the target point cloud and each respective source point cloud i; and
PC$_i$ is the respective source point cloud i.

9. The method of claim 8, wherein the sequence of point clouds is generated by a LIDAR sensor on a vehicle, and the homogenous transformation is computed based on odometry data from the vehicle captured between the target point cloud and each respective source point cloud i.

10. The method of claim 9, wherein the odometry data comprises data representing a rotation speed of one or more wheels of the vehicle.

11. The method of claim 8, wherein the value of w is an integer value between 2 to 5.

12. The method of claim 1, wherein the loss L$_{surface}$ is computed based on a local loss term L$_{focal}$ and a dice coefficient loss term L$_{dice}$ based on an equation:

$$L_{surface} = \alpha * L_{focal} + (1-\alpha) * L_{dice}.$$

13. The method of claim 12, wherein a has a value between 0.6 and 0.8.

14. The method of claim 12, wherein the local loss term L$_{focal}$ is computed based on an equation:

$$L_{focal} = -\mu^\beta (1-\hat{p}_t^\beta)^\gamma \log(\hat{p}_t^\beta),$$

wherein β the ground truth label for a given pixel, μ$^\beta$ is a class-specific weight, and $(1-p_t^\beta)^\gamma$ is a modulating term.

15. The method of claim 1, further comprising:
displaying the refined labelled BEV image on a display of a computing system.

16. A computing system for generating a road surface segmentation map, the computing system comprising:
a processor configured to:
receive a sequence of point clouds, each respective point cloud of the sequence of point clouds representing a three-dimensional (3D) scan of an environment at a different point in time;
generate an aggregated point cloud based on the sequence of point clouds;
generate, via a first neural network, a birds-eye-view (BEV) image of the environment from the aggregated point cloud, wherein the first neural network is a Pillar Feature Net (PFN) neural network;
generate, via a second neural network, a labelled BEV image from the BEV image, wherein each pixel in the labelled BEV image is associated with a class label from a set of class labels, wherein the second neural network is an encoder/decoder (E/D) neural network;
generate a BEV feature map;
generate, via a third neural network, the road surface segmentation map in the form of a refined labelled BEV image based on the labelled BEV image by smoothing the labelled BEV image using the BEV feature map, wherein each pixel in the refined labelled BEV image is associated with a class label from the set of class labels, wherein the third neural network is a Convolutional Conditional Random Field (ConvCRF) neural network; and train the PFN neural network, the E/D neural network and the ConvCRF neural network by, during each training epoch:
  generating a plurality of predicted labels by the PFN neural network, the E/D neural network and the ConvCRF neural network;
  receiving or retrieving a plurality of ground truth labels;
  computing a loss based on the plurality of ground truth labels and the plurality of predicted labels; and
  refining one or more weights in the PFN neural network, the E/D neural network and the ConvCRF neural network based on the loss.

17. A non-transitory machine-readable medium having tangibly stored thereon executable instructions for execution by one or more processors, wherein the executable instructions, in response to execution by the one or more processors, cause the one or more processors to:
  receive a sequence of point clouds, each respective point cloud of the sequence of point clouds representing a three-dimensional (3D) scan of an environment at a different point in time;
  generate an aggregated point cloud based on the sequence of point clouds;
  generate, via a first neural network, a birds-eye-view (BEV) image of the environment from the aggregated point cloud, wherein the first neural network is a Pillar Feature Net (PFN) neural network;
  generate, via a second neural network, a labelled BEV image from the BEV image, wherein each pixel in the labelled BEV image is associated with a class label from a set of class labels, wherein the second neural network is an encoder/decoder (E/D) neural network;
  generate a BEV feature map;
  generate, via a third neural network, the road surface segmentation map in the form of a refined labelled BEV image based on the labelled BEV image by smoothing the labelled BEV image using the BEV feature map, wherein each pixel in the refined labelled BEV image is associated with a class label from the set of class labels, wherein the third neural network is a Convolutional Conditional Random Field (ConvCRF) neural network; and
  train the PFN neural network, the E/D neural network and the ConvCRF neural network by, during each training epoch:
    generating a plurality of predicted labels by the PFN neural network, the E/D neural network and the ConvCRF neural network;
    receiving or retrieving a plurality of ground truth labels;
    computing a loss based on the plurality of ground truth labels and the plurality of predicted labels; and
    refining one or more weights in the PFN neural network, the E/D neural network and the ConvCRF neural network based on the loss.

* * * * *